(12) United States Patent
Paulsen

(10) Patent No.: US 8,435,105 B2
(45) Date of Patent: May 7, 2013

(54) INTERACTIVE GAME PLAYING PREFERENCES

(75) Inventor: Craig A. Paulsen, Reno, NV (US)

(73) Assignee: IGT, Reno, NV (US)

( * ) Notice: Subject to any disclaimer, the term of this patent is extended or adjusted under 35 U.S.C. 154(b) by 769 days.

(21) Appl. No.: 11/372,549

(22) Filed: Mar. 10, 2006

(65) Prior Publication Data

US 2006/0194633 A1 Aug. 31, 2006

Related U.S. Application Data

(63) Continuation of application No. 09/819,152, filed on Mar. 27, 2001, now Pat. No. 7,918,738.

(51) Int. Cl.
*A63F 9/24* (2006.01)
*A63F 13/00* (2006.01)
*G06F 17/00* (2006.01)
*G06F 19/00* (2011.01)

(52) U.S. Cl.
USPC .............................................. 463/16; 463/40

(58) Field of Classification Search ...................... 463/27
See application file for complete search history.

(56) References Cited

U.S. PATENT DOCUMENTS

| | | | |
|---|---|---|---|
| 3,662,105 A | 5/1972 | Hurst et al. | |
| 4,071,689 A | 1/1978 | Talmage et al. | |
| 4,335,809 A * | 6/1982 | Wain .............................. | 463/20 |
| 4,342,454 A | 8/1982 | Baer et al. | |
| 4,356,391 A | 10/1982 | Takeda | |
| 4,593,376 A | 6/1986 | Volk | |
| 4,689,742 A | 8/1987 | Troy et al. | |
| 4,695,053 A | 9/1987 | Vazquez, Jr. et al. | |
| 4,764,666 A | 8/1988 | Bergeron | |
| 4,837,728 A | 6/1989 | Barrie et al. | |
| 5,043,889 A | 8/1991 | Lucey | |

(Continued)

FOREIGN PATENT DOCUMENTS

| | | |
|---|---|---|
| AU | 704691 | 4/1997 |
| DE | 44 03 688 | 8/1995 |

(Continued)

OTHER PUBLICATIONS

John Scarne, Scarne's New Complete Guide to Gambling, 1974, Simon and Schuster, pp. 39-41.*

(Continued)

*Primary Examiner* — David L Lewis
*Assistant Examiner* — Reginald Renwick
(74) *Attorney, Agent, or Firm* — Foley & Lardner LLP

(57) ABSTRACT

A disclosed gaming machine may be customized according to one or more player preferences. A player may view and modify player preferences stored in a player preference account as preference account information. The preference account information may include but is not limited to loyalty point account information, loyalty point account settings, promotional opportunities, preferred games, preferred game features for the preferred games, preferred gaming machine settings, preferred bonus games, preferred service options and preferred progressive games. The preference account information may be stored in a plurality of preference accounts on a preference account server. Using a preference account interface which may be compatible with a web-browser, a player may be able to view and modify preference account information stored on the preference account server from a number remote devices such as a gaming machine, a home computer, a hotel room video interface and a casino kiosk.

19 Claims, 9 Drawing Sheets

U.S. PATENT DOCUMENTS

| | | |
|---|---|---|
| 5,073,700 A | 12/1991 | D'Onofrio |
| 5,110,129 A | 5/1992 | Alvarez |
| 5,116,055 A | 5/1992 | Tracy |
| 5,212,369 A | 5/1993 | Karlisch et al. |
| 5,265,874 A | 11/1993 | Dickinson et al. |
| 5,277,424 A | 1/1994 | Wilms |
| 5,280,809 A | 1/1994 | Tive |
| 5,286,023 A | 2/1994 | Wood |
| 5,395,242 A | 3/1995 | Slye et al. |
| 5,410,344 A | 4/1995 | Graves et al. |
| 5,429,361 A | 7/1995 | Raven et al. |
| 5,452,379 A | 9/1995 | Poor |
| 5,470,079 A | 11/1995 | LeStrange et al. |
| 5,475,740 A | 12/1995 | Biggs, Jr. et al. |
| 5,488,411 A | 1/1996 | Lewis |
| 5,494,287 A | 2/1996 | Manz |
| 5,536,016 A | 7/1996 | Thompson |
| 5,537,314 A | 7/1996 | Kanter |
| 5,577,731 A | 11/1996 | Jones |
| 5,586,936 A | 12/1996 | Bennett et al. |
| 5,605,334 A | 2/1997 | McCrea, Jr. |
| 5,638,426 A | 6/1997 | Lewis |
| 5,640,193 A | 6/1997 | Wellner |
| 5,654,746 A | 8/1997 | McMullan et al. |
| 5,655,961 A | 8/1997 | Acres et al. |
| 5,679,007 A | 10/1997 | Potdevin et al. |
| 5,679,077 A | 10/1997 | Pocock et al. |
| 5,702,304 A | 12/1997 | Acres et al. |
| 5,704,835 A | 1/1998 | Dietz, II |
| 5,707,286 A | 1/1998 | Carlson |
| 5,711,708 A | 1/1998 | Fischer |
| 5,759,102 A | 6/1998 | Pease et al. |
| 5,761,647 A | 6/1998 | Boushy |
| 5,766,076 A | 6/1998 | Pease et al. |
| 5,769,716 A | 6/1998 | Saffari et al. |
| 5,770,533 A | 6/1998 | Franchi |
| 5,779,545 A | 7/1998 | Berg et al. |
| 5,779,548 A | 7/1998 | Asai et al. |
| 5,788,573 A | 8/1998 | Baerlocher et al. |
| 5,796,389 A | 8/1998 | Bertram et al. |
| 5,800,268 A | 9/1998 | Molnick |
| 5,803,809 A | 9/1998 | Yoseloff |
| 5,809,482 A | 9/1998 | Strisower |
| 5,811,772 A | 9/1998 | Lucero |
| 5,816,918 A | 10/1998 | Kelly et al. |
| 5,820,459 A | 10/1998 | Acres et al. |
| 5,823,873 A * | 10/1998 | Moody ............................ 463/13 |
| 5,830,067 A | 11/1998 | Graves et al. |
| 5,833,536 A | 11/1998 | Davids et al. |
| 5,833,540 A | 11/1998 | Miodunski et al. |
| 5,851,148 A | 12/1998 | Brune et al. |
| 5,851,149 A | 12/1998 | Xidos et al. |
| 5,855,515 A | 1/1999 | Pease et al. |
| D406,612 S | 3/1999 | Johnson |
| 5,885,158 A | 3/1999 | Torango et al. |
| 5,902,983 A | 5/1999 | Crevelt et al. |
| 5,919,091 A | 7/1999 | Bell et al. |
| 5,923,734 A | 7/1999 | Taskett |
| 5,951,011 A * | 9/1999 | Potter et al. .................... 273/292 |
| 5,951,397 A | 9/1999 | Dickinson |
| 5,957,776 A | 9/1999 | Hoehne |
| 5,967,896 A | 10/1999 | Jorasch et al. |
| 5,971,271 A | 10/1999 | Wynn et al. |
| 5,983,196 A | 11/1999 | Wendkos |
| 5,984,779 A | 11/1999 | Bridgeman et al. |
| 5,990,885 A | 11/1999 | Gopinath |
| 6,001,016 A | 12/1999 | Walker et al. |
| 6,003,013 A | 12/1999 | Boushy |
| 6,003,651 A | 12/1999 | Walker et al. |
| 6,004,211 A | 12/1999 | Brenner et al. |
| 6,007,426 A | 12/1999 | Kelly et al. |
| 6,009,150 A | 12/1999 | Kamel |
| 6,010,404 A | 1/2000 | Walker et al. |
| 6,012,983 A | 1/2000 | Walker et al. |
| 6,015,344 A | 1/2000 | Kelly et al. |
| 6,029,046 A | 2/2000 | Khan et al. |
| 6,032,955 A * | 3/2000 | Luciano et al. ............ 273/138.1 |
| 6,048,269 A | 4/2000 | Burns et al. |
| 6,050,895 A | 4/2000 | Luciano, Jr. et al. |
| 6,062,981 A | 5/2000 | Luciano, Jr. |
| 6,068,552 A | 5/2000 | Walker et al. |
| 6,070,878 A | 6/2000 | Jones et al. |
| 6,077,163 A | 6/2000 | Walker et al. |
| 6,089,975 A | 7/2000 | Dunn |
| 6,099,408 A | 8/2000 | Schneier et al. |
| 6,110,041 A | 8/2000 | Walker et al. |
| 6,110,043 A | 8/2000 | Olsen |
| 6,113,492 A | 9/2000 | Walker et al. |
| 6,113,493 A | 9/2000 | Walker et al. |
| 6,113,495 A | 9/2000 | Walker et al. |
| 6,116,906 A | 9/2000 | Rifkin |
| 6,146,273 A | 11/2000 | Olsen |
| 6,149,522 A | 11/2000 | Alcorn et al. |
| 6,152,822 A * | 11/2000 | Herbert ........................... 463/22 |
| 6,162,121 A | 12/2000 | Morro et al. |
| 6,162,122 A | 12/2000 | Acres et al. |
| 6,165,072 A | 12/2000 | Davis et al. |
| 6,183,362 B1 | 2/2001 | Boushy |
| 6,186,404 B1 | 2/2001 | Ehrhart et al. |
| 6,203,010 B1 | 3/2001 | Jorasch et al. |
| 6,203,427 B1 | 3/2001 | Walker et al. |
| 6,210,275 B1 | 4/2001 | Olsen |
| 6,241,608 B1 | 6/2001 | Torango |
| 6,264,560 B1 | 7/2001 | Goldberg et al. |
| 6,264,561 B1 | 7/2001 | Saffari |
| 6,266,059 B1 | 7/2001 | Matthews, III et al. |
| 6,270,409 B1 | 8/2001 | Shuster |
| 6,272,223 B1 | 8/2001 | Carlson |
| 6,287,201 B1 | 9/2001 | Hightower |
| 6,287,202 B1 | 9/2001 | Pascal et al. |
| 6,293,866 B1 | 9/2001 | Walker et al. |
| 6,302,790 B1 | 10/2001 | Brossard |
| 6,315,665 B1 | 11/2001 | Faith |
| 6,319,125 B1 | 11/2001 | Acres |
| 6,325,375 B1 | 12/2001 | Potter et al. |
| 6,343,988 B1 | 2/2002 | Walker et al. |
| 6,346,044 B1 | 2/2002 | McCrea, Jr. |
| 6,358,149 B1 | 3/2002 | Schneider et al. |
| 6,375,567 B1 | 4/2002 | Acres |
| 6,388,714 B1 | 5/2002 | Schein et al. |
| 6,394,907 B1 | 5/2002 | Rowe |
| 6,409,602 B1 | 6/2002 | Wiltshire et al. |
| 6,417,591 B1 | 7/2002 | Saito et al. |
| 6,439,993 B1 | 8/2002 | O'Halloran |
| 6,450,885 B2 | 9/2002 | Schneier et al. |
| 6,450,887 B1 | 9/2002 | Mir et al. |
| 6,456,977 B1 | 9/2002 | Wang |
| 6,478,676 B1 | 11/2002 | Dayan |
| 6,504,990 B1 | 1/2003 | Abecassis |
| 6,508,709 B1 | 1/2003 | Karmarkar |
| 6,511,377 B1 | 1/2003 | Weiss |
| 6,520,856 B1 | 2/2003 | Walker et al. |
| 6,533,663 B1 | 3/2003 | Iwao et al. |
| 6,554,709 B1 | 4/2003 | Brenner et al. |
| 6,572,477 B2 | 6/2003 | Hightower |
| 6,585,592 B1 | 7/2003 | Crumby |
| 6,589,115 B2 | 7/2003 | Walker |
| 6,592,460 B2 | 7/2003 | Torango |
| 6,599,193 B2 | 7/2003 | Baerlocher et al. |
| 6,645,068 B1 | 11/2003 | Kelly et al. |
| 6,645,077 B2 | 11/2003 | Rowe |
| 6,675,152 B1 | 1/2004 | Prasad |
| 6,685,567 B2 | 2/2004 | Cockerille et al. |
| 6,697,944 B1 | 2/2004 | Jones et al. |
| 6,709,333 B1 | 3/2004 | Bradford et al. |
| 6,712,698 B2 | 3/2004 | Paulsen et al. |
| 6,716,103 B1 | 4/2004 | Eck et al. |
| 6,722,985 B2 | 4/2004 | Criss-Puszkiewicz et al. |
| 6,724,385 B2 | 4/2004 | Takatsuka et al. |
| 6,729,956 B2 | 5/2004 | Wolf et al. |
| 6,743,098 B2 | 6/2004 | Urie et al. |
| 6,758,757 B2 | 7/2004 | Luciano, Jr. et al. |
| 6,776,715 B2 | 8/2004 | Price |
| 6,804,763 B1 | 10/2004 | Stockdale et al. |
| 6,852,031 B1 | 2/2005 | Rowe |
| 6,863,608 B1 | 3/2005 | LeMay et al. |
| 6,866,586 B2 | 3/2005 | Oberberger et al. |

| | | |
|---|---|---|
| 6,884,170 B2 * | 4/2005 | Rowe .................... 463/31 |
| 6,921,336 B1 | 7/2005 | Best |
| 6,929,549 B1 | 8/2005 | Yamada |
| 6,942,570 B2 | 9/2005 | Schneier et al. |
| 6,942,574 B1 | 9/2005 | LeMay et al. |
| 6,964,416 B2 | 11/2005 | McClinitic et al. |
| 6,979,266 B2 | 12/2005 | LeMay et al. |
| 7,008,319 B2 * | 3/2006 | Montgomery et al. ...... 463/21 |
| 7,008,322 B1 | 3/2006 | Suzuki et al. |
| 7,083,520 B2 | 8/2006 | Rowe |
| 7,275,994 B2 | 10/2007 | Eck et al. |
| 7,470,197 B2 | 12/2008 | Massey et al. |
| 7,481,430 B1 * | 1/2009 | Jackson et al. ........... 273/138.1 |
| 2001/0028147 A1 | 10/2001 | Ornstein et al. |
| 2001/0036858 A1 | 11/2001 | McNutt et al. |
| 2002/0042297 A1 | 4/2002 | Torango et al. |
| 2002/0077712 A1 | 6/2002 | Safaei et al. |
| 2002/0098888 A1 | 7/2002 | Rowe et al. |
| 2002/0103027 A1 | 8/2002 | Rowe et al. |
| 2002/0142815 A1 | 10/2002 | Candelore |
| 2002/0142825 A1 | 10/2002 | Lark et al. |
| 2002/0142846 A1 | 10/2002 | Paulsen |
| 2002/0147047 A1 | 10/2002 | Letovsky et al. |
| 2002/0147640 A1 | 10/2002 | Daniele et al. |
| 2002/0151366 A1 | 10/2002 | Walker et al. |
| 2002/0155874 A1 | 10/2002 | Byrne |
| 2002/0178446 A1 | 11/2002 | Sie et al. |
| 2002/0193160 A1 | 12/2002 | Tarantino |
| 2002/0198052 A1 | 12/2002 | Soltys et al. |
| 2003/0027630 A1 | 2/2003 | Kelly et al. |
| 2003/0050806 A1 | 3/2003 | Friesen et al. |
| 2003/0064805 A1 | 4/2003 | Wells |
| 2003/0073497 A1 | 4/2003 | Nelson |
| 2003/0083943 A1 | 5/2003 | Adams et al. |
| 2003/0100361 A1 | 5/2003 | Sharpless et al. |
| 2003/0144057 A1 | 7/2003 | Brenner et al. |
| 2003/0148808 A1 | 8/2003 | Price |
| 2003/0163399 A1 | 8/2003 | Harper et al. |
| 2003/0171149 A1 | 9/2003 | Rothschild |
| 2003/0176218 A1 | 9/2003 | LeMay et al. |
| 2003/0176220 A1 | 9/2003 | Baerlocher |
| 2003/0190944 A1 | 10/2003 | Manfredi |
| 2003/0203756 A1 | 10/2003 | Jackson |
| 2003/0220135 A1 | 11/2003 | Gauselmann |
| 2004/0002379 A1 | 1/2004 | Parrott et al. |
| 2004/0087370 A1 | 5/2004 | Tarantino |
| 2004/0107821 A1 | 6/2004 | Alcalde et al. |
| 2004/0111745 A1 | 6/2004 | Schein et al. |
| 2004/0116174 A1 | 6/2004 | Baerlocher et al. |
| 2004/0139318 A1 | 7/2004 | Fiala et al. |
| 2004/0147314 A1 | 7/2004 | LeMay et al. |
| 2004/0242324 A9 | 12/2004 | Walker et al. |
| 2005/0003883 A1 | 1/2005 | Muir et al. |
| 2005/0050571 A1 | 3/2005 | Wisnudel et al. |
| 2005/0096125 A1 | 5/2005 | LeMay et al. |
| 2005/0170890 A1 | 8/2005 | Rowe et al. |
| 2006/0025193 A1 | 2/2006 | Gail et al. |
| 2006/0095331 A1 | 5/2006 | O'Malley et al. |
| 2006/0166740 A1 | 7/2006 | Sufuentes |
| 2007/0072678 A1 | 3/2007 | Dagres |
| 2007/0155490 A1 | 7/2007 | Phillips et al. |
| 2007/0167229 A1 | 7/2007 | LeMay et al. |
| 2007/0203971 A1 | 8/2007 | Walker et al. |
| 2007/0282678 A1 | 12/2007 | Dendi et al. |
| 2008/0054561 A1 | 3/2008 | Canterbury et al. |
| 2008/0076548 A1 | 3/2008 | Paulsen |
| 2008/0167954 A1 | 7/2008 | Kawakami |
| 2008/0204428 A1 | 8/2008 | Pierce et al. |
| 2008/0224822 A1 | 9/2008 | Gelman et al. |
| 2008/0270579 A1 | 10/2008 | Herz et al. |

FOREIGN PATENT DOCUMENTS

| | | |
|---|---|---|
| DE | 199 05 076 | 5/2000 |
| DE | 199 44 140 | 3/2001 |
| EP | 0769 769 | 4/1997 |
| EP | 0 887 753 | 12/1998 |
| EP | 1 039 423 | 9/2000 |
| EP | 1 087 323 | 3/2001 |
| EP | 1 136 930 | 9/2001 |
| EP | 1 396 829 | 3/2004 |
| EP | 1 482 459 | 12/2004 |
| GB | 2 383 880 | 7/2003 |
| WO | 98/50876 | 11/1998 |
| WO | WO 00/38089 | 6/2000 |
| WO | WO 00/76239 | 12/2000 |
| WO | WO 00/79489 | 12/2000 |
| WO | WO 01/75815 | 10/2001 |
| WO | WO 01/81093 | 11/2001 |
| WO | WO 02/01458 | 1/2002 |
| WO | 02/24288 | 3/2002 |
| WO | WO 02/077935 | 10/2002 |
| WO | WO 2004/027584 | 4/2004 |
| WO | 2004/056432 | 7/2004 |
| WO | WO 2005/028056 | 3/2005 |

OTHER PUBLICATIONS

U.S. Office Action mailed Jul. 7, 2002, from corresponding U.S. Appl. No. 09/819,152.

U.S. Office Action mailed Jun. 15, 2004, from corresponding U.S. Appl. No. 10/106,992.

U.S. Office Action mailed Dec. 14, 2004, from corresponding U.S. Appl. No. 09/819,152.

U.S. Office Action mailed Nov. 14, 2005, from corresponding U.S. Appl. No. 10/106,992.

U.S. Office Action mailed Dec. 5, 2006, from corresponding U.S. Appl. No. 10/106,992.

U.S. Office Action mailed Mar. 27, 2007, from corresponding U.S. Appl. No. 09/819,152.

U.S. Office Action mailed Oct. 13, 2006, from corresponding U.S. Appl. No. 10/915,117.

International Search Report and Written Opinion dated Feb. 27, 2006 from a related PCT Application No. PCT/US2005/036116 (10 pages).

PCT International Search Report and Written Opinion dated Nov. 24, 2005 from corresponding PCT Application No. PCT/US2005/026696 (9 pages).

European Search Report dated Aug. 16, 2005 from corresponding EP Application No. 02728584.0 (7 pages).

Communication Pursuant to Article 96(2) EPC, European Patent Office, Application No. 02 728 584.0-2221, Applicant: IGT, Date: Jan. 9, 2004.

Final Office Action from U.S. Appl. No. 09/819,152, dated Apr. 13, 2004, 11 pages.

Final Office Action from U.S. Appl. No. 09/819,152, dated Apr. 29, 2003, 11 pages.

Final Office Action from U.S. Appl. No. 10/242,149, dated Dec. 2, 2004, 9 pages.

Final Office Action from U.S. Appl. No. 10/106,992, dated Jul. 23, 2007, 18 pages.

International Search Report from PCT Application No. PCT/US2002/009425, dated May 28, 2003, 10 pages.

International Search Report from PCT Application No. PCT/US03/27137 dated Jan. 15, 2004, 6 pgs.

Office Action from U.S. Appl. No. 10/910,407, dated Jul. 13, 2007, 11 pages.

Office Action from U.S. Appl. No. 09/819,152, dated Sep. 8, 2003, 12 pages.

Office Action from U.S. Appl. No. 10/242,149, dated May 6, 2004, 10 pages.

Office Action from U.S. Appl. No. 10/242,149, dated Mar. 22, 2005, 11 pages.

Office Action from U.S. Appl. No. 10/242,149, dated Nov. 15, 2005, 13 pages.

Final Office Action dated Dec. 13, 2007 from U.S. Appl. No. 09/819,152.

Office Action dated Dec. 31, 2007 from related U.S. Appl. No. 10/106,992.

Final Office Action from U.S. Appl. No. 10/910,407, dated Dec. 31, 2007.

Search Report and Written Opinion dated Apr. 16, 2008 from related PCT Application No. PCT/US2007/016367, 13 pages.

Office Action dated Jun. 3, 2008 from related U.S. Appl. No. 09/819,152.
Office Action dated Jun. 12, 2008 from related U.S. Appl. No. 10/910,407.
International Search Report from PCT Application No. PCT/US2007/016367, dated Apr. 16, 2008.
European Examination Report dated Nov. 14, 2007 from related European Application No. 05 807 613.4.
European Examination Report dated Jan. 16, 2008 from related European Application No. 06 735 371.4.
International Search Report with Written Opinion dated Jul. 26, 2006 from corresponding PCT Application No. PCT/US2006/005677.
European Office Action dated Dec. 20, 2005 from a related EP Application No. 02773484.7 (3 pages).
Wang Z et al.; "Casino Technology: Player Tracking and Slot Accounting Systems" Gaming Research and Review Journal, UNLV International Gaming Institute, Las Vegas, NV, U.S. vol. 6, No. 1, 2000, pp. 43-56, XP001149561, ISSN: 1531-0930, the whole document (14 pages).
Office Action from U.S. Appl. No. 10/958,843, dated Aug. 17, 2007.
Office Action from U.S. Appl. No. 10/958,843, dated Mar. 25, 2008.
European Office Action dated Jan. 12, 2007 in related EP Application No. 02773484.7.
International Search Report and Written Opinion dated Jun. 14, 2006 from Related PCT Application No. PCT/US2006/005685 8 pages.
International Search Report and Written Opinion dated Jun. 14, 2006 from Related PCT Application No. PCT/US2006/005455 9 pages.
Paul Yao, Microsoft Windows CE 2.0: It's Not Just for Handheld PCs Any More—MSJ, May 1998; www.microsoft.com/msj/0598/wince.aspx (pp. 1-23).
Mark Fischetti, Touch Screens: At Your Fingertips, Scientific American, Apr. 2001 (pp. 102-103).
Dan Bricklin, About Tablet Computing Old and New, Nov. 22, 2002; http://www.bricklin.com/tabletcomputing.htm (pp. 1-7).
Office Action from U.S. Appl. No. 11/064,217, dated Jun. 24, 2008.
Office Action from U.S. Appl. No. 10/958,843, dated Sep. 15, 2008.
Final Office Action from U.S. Appl. No. 11/064,217, dated Jan. 29, 2009.
U.S. Office Action dated Oct. 24, 2008 from U.S. Appl. No. 10/106,992, 30 pgs.
U.S. Office Action dated Oct. 16, 2008 from U.S. Appl. No. 11/459,245.
U.S. Office Action dated Jan. 9, 2009 from U.S. Appl. No. 10/910,407.
Download-Games.com webpage, USPTO Archives (Wayback), webpage dated Feb. 5, 2003 (2 pages).
U.S. Final Office Action dated Jan. 12, 2009 from U.S. Appl. No. 09/819,152.
Office Action dated Oct. 2, 2008 from U.S. Appl. No. 11/830,796; 14 pgs.
Australian Exam Report dated Feb. 25, 2009 from Application No. 2007201929, 1 pg.
U.S. Office Action dated Apr. 28, 2009 from U.S. Appl. No. 11/459,245; 24 pgs.

* cited by examiner

INTERACTIVE GAME PLAYING PREFERENCES

RELATED APPLICATION DATA

The present application claims priority under U.S.C. 120 and is a continuation of U.S. patent application Ser. No. 09/819,152, titled "INTERACTIVE GAME PLAYING PREFERENCES" filed on Mar. 27, 2001 now U.S. Pat. No. 7,918,738, which is incorporated herein by reference in its entirety and for all purposes.

BACKGROUND OF THE INVENTION

This invention relates to game playing methods for gaming machines such as video slot machines and video poker machines. More particularly, the present invention relates to methods of allowing game players to customize game play on gaming machines.

As technology in the gaming industry progresses, the traditional mechanically driven reel slot machines are being replaced with electronic counterparts having CRT, LCD video displays or the like and gaming machines such as video slot machines and video poker machines are becoming increasingly popular. Part of the reason for their increased popularity is the nearly endless variety of games that can be implemented on gaming machines utilizing advanced electronic technology. In some cases, newer gaming machines are utilizing computing architectures developed for personal computers. These video/electronic gaming advancements enable the operation of more complex games, which would not otherwise be possible on mechanical-driven gaming machines and allow the capabilities of the gaming machine to evolve with advances in the personal computing industry.

Typically, utilizing a master gaming controller, the gaming machine controls various combinations of devices that allow a player to play a game on the gaming machine and also encourage game play on the gaming machine. For example, a game played on a gaming machine usually requires a player to input money or indicia of credit into the gaming machine, indicate a wager amount, and initiate a game play. These steps require the gaming machine to control input devices, including bill validators and coin acceptors, to accept money into the gaming machine and recognize user inputs from devices, including touch screens and button pads, to determine the wager amount and initiate game play.

After game play has been initiated, the gaming machine determines a game outcome, presents the game outcome to the player and may dispense an award of some type depending on the outcome of the game. A game outcome presentation may utilize many different visual and audio components such as flashing lights, music, sounds and graphics. The visual and audio components of the game outcome presentation may be used to draw a players attention to various game features and to heighten the players interest in additional game play. Maintaining a game player's interest in game play is an important consideration for a gaming machine operator.

One related method of gaining and maintaining a game player's interest in game play is loyalty point programs offered by the various casinos. Loyalty point programs provide rewards to players that typical correspond to a percentage of the player's game play at one or more casinos. Loyalty point rewards may be free meals, free lodging and free entertainment. These rewards may help to sustain a game player's interest in additional game play. However, a disadvantage of current loyalty point programs is that loyalty point information is not easily accessible to game players. For instance, a player can not easily determine how many loyalty points they have accrued, how many points are needed to obtain a specific reward and the amount of loyalty points that may be rewarded for a specific activity. The absence of these features, which are common in loyalty point programs such as airline mile programs, may limit the value of gaming loyalty point programs for a game player and the value these programs have on increasing a game player's interest in game play.

Another related method of gaining and maintaining game player's interest in game play is an arrangement of various types of gaming machine and prize displays on a casino floor. Often, casinos find that particular arrangements on the casino floor of gaming machines maximize game play. Specifically, games may be placed in certain locations on the floor to attract customers into the casino and maximize game play on the various gaming machines. The location of a particular gaming machine in the arrangement may depend on a prize, a type of game or other gaming features offered on the gaming machine such as particular audio effects and visual effects. For example, a gaming machine offering a particular prize or bonus feature, which is popular, might be placed near the door to attract customers into the casino. In fact, the distribution of gaming machines on a casino floor is sometimes considered a proprietary secret of casinos.

Over time, what was once a very enticing arrangement becomes less interesting to players. However, play can be increased again by rearranging the layout of gaming machines on the casino floor. Unfortunately, changing the distribution of gaming machines on the casino floor requires that someone physically move the gaming machines to different locations. This can be a very tedious and time-consuming exercise.

Further, floor layouts are designed to appeal to as many game player's as possible. However, for any layout, some player's may like or dislike the layout depending on personal preferences. Thus, it is nearly impossible to design a floor layout that will appeal uniformly to every game player's preferences.

Accordingly, it would be desirable to provide game playing methodologies for gaming machines that maintain and increase game playing interest and also reduce a frequency of rearrangement of gaming machines on the casino floor.

SUMMARY OF THE INVENTION

This invention addresses the indicated above by providing a gaming machine that may be customized according to one or more player preferences. A player may view and modify player preferences stored in a player preference account as preference account information. The preference account information may include but is not limited to loyalty point account information, loyalty point account settings, promotional opportunities, preferred games, preferred game features for the preferred games, preferred gaming machine settings, preferred bonus games, preferred service options and preferred progressive games. The preference account information may be stored in a plurality of preference accounts on a preference account server. Using a preference account interface which may be compatible with a web-browser, a player may be able to view and modify preference account information stored on the preference account server from a number remote devices such as a gaming machine, a home computer, a hotel room video interface and a casino kiosk.

One aspect of the present inventions provides a gaming machine. The gaming machine may be generally characterized as including: 1) a master gaming controller that is designed or configured to control one or more games played on the gaming machine and to request preference account information from a remote server and 2) a memory that is designed or configured to store gaming software that allows the master gaming controller to request one or more different portions of the preference account information from the remote server where the preference account information comprises one or more of a) loyalty point account information, b) loyalty point account settings, c) promotional opportunities, d) preferred games, e) preferred game features for the preferred games, f) preferred gaming machine settings, g) preferred bonus games and h) preferred progressive games. A first portion of the preference account information and a second portion of the preference account information may be requested from a preference account on the remote server where the first portion and the second portion are different.

In particular embodiments, the loyalty point account information may comprise at least one or more records of an amount of loyalty points rewarded during a particular event where the particular event comprises a food purchase, an entertainment purchase, a lodging purchase, a merchandise purchase, a transportation purchase or a game play. The loyalty point account settings may be selected from the group consisting of a name, an address, contact information, tax information and preferred rewards. The promotional opportunities may be one or more particular events that allow a player participating in the one or more events to earn extra loyalty points.

In other embodiments, the preferred games may be selected from the group consisting of video slots games, video poker games, video black jack games, video pachinko games, video card games, video keno games and video games of chance. The preferred gaming features for the preferred games may be selected from the group consisting of game versions, game color schemes, game graphical features, a game presentation speed, game pay-out tables and game audio features. The preferred gaming machine settings may be selected from the group consisting of a volume setting, an input interface configuration, a display setting, a denomination setting, a betting preference setting and a beverage setting.

In other embodiments, the gaming machine may include a biometric input device designed or configured to receive biometric information from a game player where the biometric input device is selected from the group consisting of a finger print reader, a retina scanner, a camera and a microphone. The gaming machine may also include an interface designed or configured to display preference account information where the interface is compatible with a web browser. The gaming machine may include one or more input devices designed or configured to input preference account information where the input device is selected from the group consisting of a video touch screen, a button panel, a track ball, a mouse, a microphone, a touch pad, a card reader, a joy stick, a wireless interface and a key pad.

Another aspect of the present invention provides preference account server. The preference account server may be generally characterized as including: 1) a logic device designed or configured to execute one or more software applications allowing the preference account information to be input into a plurality of different preference accounts and allowing different portions of the preference account information stored in each of the plurality of different preference accounts to be accessed and to be modified from an external device, 2) a communication interface designed or configured to provide the preference account information to the external device; and 3) a memory designed or configured to store the preference account information for the plurality of different preference accounts.

In particular embodiments, the external device may be selected from the group consisting of a gaming machine, a home computer, a casino kiosk, a personal digital assistant, a phone, and a video display where the video display may be located in a hotel room or a restaurant. The communication interface may be designed or configured to allow communication with an external device connected to a local area network, a wide area network or the Internet. Further, one of the software applications may be designed or configured to generate a game presentation simulation using the preference account information and to display the game presentation simulation to the external device.

In other embodiments, the preference account information may comprises one or more of a) loyalty point account information where the loyalty point account information may include at least one or more records of an amount of loyalty points rewarded during a particular event, b) loyalty point account settings where the loyalty point account settings may be selected from the group consisting of a name, an address, contact information, tax information and preferred rewards, c) promotional opportunities such as one or more particular events that allow a player participating in the one or more events to earn extra loyalty points, d) preferred games where the preferred games may be selected from the group consisting of video slots games, video poker games, video black jack games, video pachinko games, video card games, video keno games and video games of chance, e) preferred game features such as game versions, game color schemes, game graphical features, a game presentation speed, game pay-out tables and game audio features, f) preferred gaming machine settings, g) preferred bonus games and h) preferred progressive games.

Another aspect of the present invention provides a method of customizing a game play on a gaming machine according to one or more player preferences. The method may be generally characterized as including: 1) selecting a preference account, 2) receiving preference account information, 3) reconfiguring the gaming machine using the preference account information; and 4) executing a game play on the reconfigured gaming machine where the preference account information comprises one or more of loyalty point account information, loyalty point account settings, promotional opportunities, preferred games, preferred game features for the preferred games, preferred gaming machine settings, preferred bonus games and preferred progressive games.

In particular embodiments, the method may include one or more of the following a) sending a message including a request for preference account information to a remote server and receiving preference account information from the remote server, b) sending a first message including a request for a first portion of the preference account information from a preference account on the remote server and sending a second message including a request for a second portion of the preference account information from the preference account on the remote server where the second portion is different from the first portion, c) displaying the preference account information to a video display, d) receiving a request to access the preference account and authenticating the request where the access request is authenticated using biometric information and e) sending preference account information to an external storage unit where the external storage unit comprises a smart card, a magnetic striped-card, a paper print-out, a remote server and a personal digital assistant.

Another aspect of the present invention is a method of providing player preference information to an external device. The method may be generally characterized as including: 1) receiving a message requesting preference account information from the external device, 2) selecting a preference account, 3) retrieving the preference account information from the preference account and 4) sending a message containing the preference account information to the external device where the preference account information comprises one or more of loyalty point account information, loyalty point account settings, promotional opportunities, preferred games, preferred game features for the preferred games, preferred gaming machine settings, preferred bonus games and preferred progressive games. The external device may be selected from the group consisting of a gaming machine, a casino kiosk, a home computer and a remote video display.

In particular embodiments, the method may include one or more of the following: a) displaying one or more menus to an external interface used by the external device where the external interface is a web browser, b) simulating a game presentation for a gaming machine using the preference account information and displaying the game presentation to the external interface, c) adding preference account information and deleting preference account information, d) storing preference account information, e) authenticating the request for preference account information and f) sending a first message containing a first portion of the preference account information from a preference account on the remote server to the external device and sending a second message containing a second portion of the preference account information from the preference account on the remote server to the external device where the second portion is different from the first portion.

Another aspect of the present invention provides a method of creating or modifying a player preference account for a gaming machine. The method may be generally characterized as including: 1) identifying a player desiring to create or modify the player preference account from a computing device used by the player, 2) presenting an user interface on the computing device comprising a plurality of preference account options, 3) receiving user inputs specifying one or more of the player preference account options; and 4) creating or modifying the player preference account based on the received user inputs. The preference account options may include one or more of: a) selections of loyalty point account settings, b) selections of preferred games, c) selections of preferred game features for said preferred games, d) selections of preferred gaming machine settings, e) selections of preferred bonus games, f) selections of preferred progressive games, and g) selections of redeemable awards.

These and other features of the present invention will be presented in more detail in the following detailed description of the invention and the associated figures.

DESCRIPTION OF THE PREFERRED EMBODIMENTS

Figure 1A:
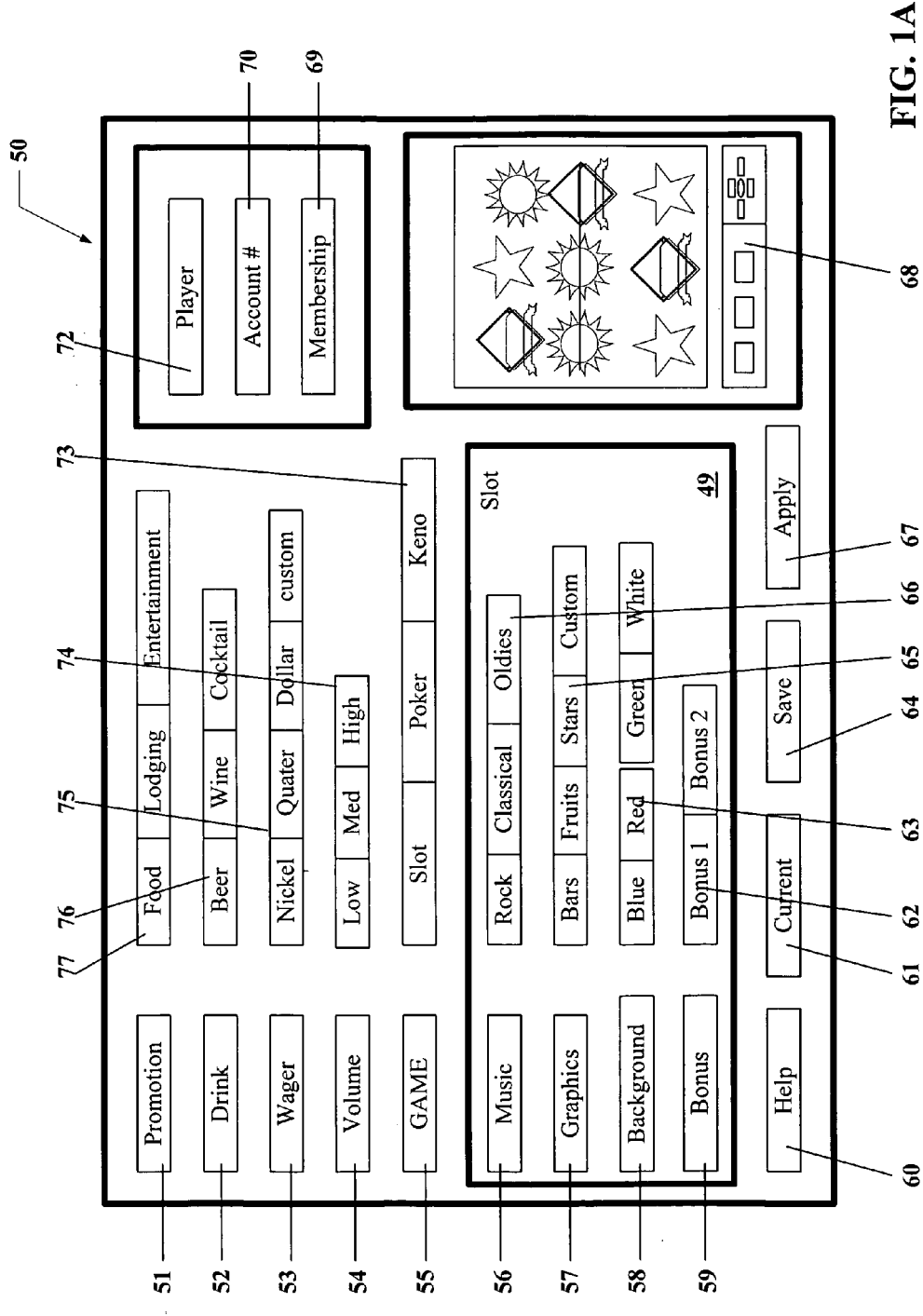
FIG. 1A is a block diagram of an interface for modifying a player preference account.

FIG. 1A is a block diagram of a user interface 50 for modifying a player preference account. The user interface 50 may be displayed on a computing device of some type such as a gaming machine or a home computer using a remote server designed or configured to store the player preference account and support the user interface 50 (see FIGS. 2 and 3 for more details). In one embodiment, the user interface may be accessed using a web browser. The user interface 50 may be used by a game player to create and modify a preference account that includes preference account information corresponding to one or more game playing options preferred by the player. The user interface 50 may be also used by a game operator or a preference account administrator to create and modify preference accounts for a plurality of game players. One or more preference account options selected by the player or by a representative of a gaming entity such as a casino may be used to customize a game playing experience of the player. The preference account options selected by a player may be stored as preference account information on a preference account server (See FIG. 2).

The preference account information may include but is not limited to one or more of the following: 1) loyalty point account information and settings (See FIG. 1B), preferred promotional opportunities, preferred games and game feature settings for the games, preferred gaming machine settings, preferred bonus games, preferred progressive games and preferred service options. For instance, using the user interface 50, a player may choose to be informed about one or more promotional opportunities preferred by the player in a promotion category 51. Examples of promotional opportunities may be a discount at a restaurant when the player visits a casino during a certain time period or a lodging discount that becomes available to the player after participating in one or more activities such as playing a particular gaming machine at a particular casino location.

After selecting the promotion category button 51, a player may select from among a number of different promotional choices 77, such as food, lodging and entertainment, which may be available through the interface 50. The promotional choices 77 available on the interface 50 may change with time. Further, the promotional choices 77 available to the player may depend on a number of parameters particular to the player using the interface 50. For instance, a first time user of the interface 50 may be offered particular promotions that are different from a player that has used the interface, 50, multiple times. As another example, players may be offered different promotions according to their age, gender or other personal characteristics.

In general, the entire interface 50 may be customized according to characteristics of individual player or groups of players. For instance, a size of the text on the interface may be increased for older players or the interface 50 may provide interface settings that allow the interface to be customized according to the preferences of an individual player. For example, a number of interface formats may be available for selection by players that allow the preference account information to be displayed in different manners. The interface formats may differ from another in many ways such as by an amount of information stored on each page, a type of information stored on each page, a graphics scheme, a color scheme, a text font size, etc.

Additional menus and selections may be provided under each promotional category 77. For instance, after selecting the food promotion in 77, different restaurant selections in different categories such as American, Indian, Italian, Chinese or Mexican may be displayed and selected by the player using the interface 50. In one embodiment of the present invention, a player selecting one or more promotional opportunities may be contacted in some manner to encourage them to take advantage of a particular promotion. For instance, a player may be informed of promotional opportunities via e-mail, direct mail, phone solicitations or messages to a gaming machine based upon preference options selected by the player and stored in their preference account as preference account information. The player using the interface may be able to select the mode (e.g. phone, e-mail, etc.) used to contact them about a promotion.

Another type of preference a player may be able to specify using the interface 50 is a preferred service option. A few examples of a preferred service options, which are provided for illustrative purposes and are not meant to limit the invention, may be a drink that a player likes to be served, a type of snack that a player likes to be served or a preferred method of crediting awards at a gaming machine. In 50, a player may select the drink category 52 button which allows the player to select from a number of beverage types 76, such as beer, wine and cocktails that a player may be served while playing a game on a gaming machine or using some other service at an entertainment venue. For instance, preference account information previously entered by a player may be available at a restaurant used by the player in a casino. When a player has a selected a preferred beverage that is stored in a preference account, a waiter in the restaurant may obtain this information from a user interface, such as interface 50, and ask the player whether they would like to be served their preferred beverage. As another example, some gaming machines include a cocktail button that allows a player at the machine to request a drink. The cocktail button may be used with the present invention to allow a player's pre-selected beverage to be brought to the player.

As mentioned above, as another example of preferred service option setting, a player may be allowed to select (not shown) a preferred method of receiving credits from a gaming machine. For instance, some newer gaming machines allow players to receive awards as a printed award ticket such as an EZ Pay™ ticket instead of cash. With the present invention, a player may specify to receive credits as an indicia of credit such as tokens dispensed from the gaming machine, to receive credits on a printed award ticket, to receive credits as a deposit to an account via an electronic fund transfer or combinations thereof. For instance, a player may specify to have 10% of their credits at a gaming machine received as tokens, to have 50% of their credits received as an award ticket and to have 40% of their credits deposited to a deposit account via an electronic fund transfer.

Another type of preference a player may be able to specify using the interface 50 is one or more preferred gaming machine setting. Again, the availability of the gaming machine settings may vary from one type of gaming machine to another type of gaming machine. A preferred gaming machine setting may allow the player to control various gaming machine features, such as but not limited to a volume for audio output from the gaming machine, a preferred gaming machine denomination, a preferred betting pattern, a preferred video display adjustment (e.g., contrast or brightness), an input configuration for the input devices on the gaming machine and preferred games on the gaming machine.

As an example of selecting a gaming machine setting, using the wager button 53 in the interface 50, a player may select from a number of gaming machine denominations 75, such as nickel, quarter, dollar or custom. The custom button may allow the player to specify a specific denomination such as a favorite number or a lucky number. The custom denomination feature may be enabled when a player is credited an award using an award ticket or electronic fund transfer. The denominations may vary as function of a local currency where the gaming machine is located. For instance, in the United Kingdom a player may select denominations in pence and pounds. A player may also be able to select a betting pattern (not shown in the figure) such as a multiple of the denomination selected on the gaming machine. Thus, when a player initiates a game on a gaming machine that has been configured to reflect the players selected preferences, the gaming machine may use the player's preferred betting preferences.

In another example of a gaming machine setting, a player may be able to select a volume setting on the gaming machine. After selecting the volume setting 54 on the gaming machine, the player may select a volume level option 74 such as a low, a medium or a high setting according to the individual taste of a player, e.g., some players may like a very noisy gaming machine while other player may prefer a quieter gaming machine during game play.

In another example of a gaming machine setting, a player may be to select a preferred game that the player likes to play on a gaming machine. This feature is only available on gaming machines offering multiple game choices. For instance, using the game button 55, a player may select from a number of different games 73 such as video slots, video poker and video keno. Other games which may be available as a player preference selection include but are not limited to video black jack games, video pachinko games, video card games, video keno games and video games of chance. As previously mentioned, additional menus (not shown) may be available with an preference account interface such as interface 50. For instance, a player may select from a number of different types of video poker games such as single player poker, double play poker, triple play poker, 10 play poker, 100 play poker, etc.

Another type of preference a player may be able to specify using the interface 50 is one or more preferred game feature settings for a preferred game selected by the player. The preferred game feature setting may vary according to the game selected. For example, one type of video slot game may allow different game feature setting than another type of video slot game or than a video poker game. The preferred game feature settings may include but are not limited to a game version, a game color scheme, game graphical features, a game presentation speed, a game pay-out table and a game audio feature. For instance, a player may be able to increase or decrease the speed of a game presentation within a specified range using a game presentation speed setting (not shown).

A player may use a game feature interface 49 portion of the interface 50 to select various game feature settings such as music types that may be played while a particular game is executed on the gaming machine. The music may be integrated into the game presentation or a player may be able to listen to the music separately through some output means, such as headphones, while the player is playing a game on the gaming machine. For instance, using the music button category 56, a player may select from one or more types of music categories 66 such as rock, classical or oldies. Again, under each category, additional music selections (not shown) may be available. Further additional categories, such as country music or alternative music, may also be available through the interface. The musical selections may be game specific, e.g. the musical selections may vary from video slot game to another or may vary between video slot games and video poker games. Thus, the format of game feature interface 49 may change depending on a game selection 73 made by the player.

Using the game feature 49 interface portion, a player may be able to select graphic patterns on a gaming machine such as color schemes and graphic symbols that are integrated into a game presentation displayed on the gaming machine. For instance, for a video slot game, a player may use the graphics button 57 to choose a symbol type 65, such as bars, fruits, stars and custom, which may be used in a video slot game presentation. When the fruit button is selected from the symbol types 65, fruits may be used as symbols in the video slot game presentation. The fruit button may include additional selections (not shown) such as types of fruits (e.g. oranges, apples, pears, cherries, strawberries, etc.) which a player may select. When the custom button is selected, a player may be able to select a custom graphic such as a picture of the player or a picture of pet, which may be integrated into a video game presentation on the gaming machine. For instance, in a video poker game, a player's face may be used as a face for a card such as a king or a queen. A player may download a picture in an electronic format using other menus (not shown) available on the interface 50. As another example, using the background category button 58, a player may select a background color 63, such as but not limited to blue, red, green or white, which may integrated into a video game presentation on the gaming machine.

As another example, a player may be able to select bonus games that are integrated into a game presentation displayed on the gaming machine. For example, by selecting the bonus category button 59, a player may be able to select one of two different bonus games 62 available in game feature setting menu 49. A player may also be able to select from a number of types of progressive games available with a particular video game presentation on the gaming machine. In some embodiments, the user interface 50 may be designed or configured to allow a player to design a custom or personal progressive game. For example, a player may be able to design a progressive game that is based upon a number of favorite games a player likes to play. In yet another example, a player may be able to select certain prizes and pay-out tables that a player may be utilized for determining a game award. An example of prize selection methodology is described with reference to U.S. application Ser. No. 09/515,717, "Name Your Prize Game Playing Methodology," by Binh T. Nguyen which is incorporated herein by reference in its entirety and for all purposes.

A progressive game network offering progressive game services is one example where a group of gaming machines are linked together using a dedicated network to provide a network gaming service. The progressive game services enabled by the progressive game network increase the game playing capabilities of a particular gaming machine by enabling a larger jackpot than would be possible if the gaming machine was operating in a "stand alone" mode. The potential size of the jackpot increases as the number gaming machines connected in the progressive network is increased. The size of the jackpot tends to increase game play on gaming machines offering a progressive jackpot which justifies the costs associated with installing and maintaining the dedicated progressive game network.

For multiple gaming machines linked by a network, the jackpot on a single gaming machine may vary in time. For example, the amount of money entered into a group of gaming machines can be pooled together to provide a larger jackpot for groups of gaming machines linked together as part of a wide area progressive network or a casino area network. As money is entered into an individual gaming machine, this information can be relayed over the communication network to a central location where the total amount of money in the jackpot is tracked for the group of gaming machines linked together. The information on the total jackpot, which changes with time, can be sent out over the wide area progressive network or casino area network to display signs displaying the jackpot amount. Thus, the jackpot amount for a gaming machine linked to a wide area progressive network or casino area network will increase with time until the jackpot is reset. However, the odds of winning the jackpot remain fixed.

The user interface 50 may allow a player or user (e.g. an interface administrator) to view and possibly modify player identification information. Some information stored in the preference account, such as player identification information, may be privileged in that only an interface administrator or other entity with necessary access privileges may be able to modify the privileged information. For instance, an administrator may be able to view and modify a players name 72, an account number 70, a type of membership 69, a player's address (not shown) for many players. However, a player using the interface 50 may be able to only view and modify this information for their own account.

The type of membership 69 may correspond to a value of the player and accord different privileges to the player that may be selected. For instance, a player may be a platinum, a gold, a diamond or a silver member (displayed in 69) according to an amount or a frequency of game play by the player. Using the interface 50, platinum members may be able to make different preference selections than a silver member. For example, only platinum members may be allowed to select and to play certain games or use certain pay-out tables.

The user interface 50 may include a number of command buttons such as help 60, current 61, save 64 and apply 67 that allow a user of the interface 50 to execute different commands. For example, a user may be able to see the effects of game feature setting using the apply button 67. When the apply button is selected, a simulation of a game presentation using the game feature settings selected in 49 may be presented in window 68. In 68, the game simulation may allow the user to see different graphics implemented in a game presentation, hear different types of music and determine the functions of different input buttons on the gaming machine.

In other example, the help button 60 may allow the user to obtain help relating to using the interface 50. Help instructions may be displayed in window 68 or another window. The current button 61 may allow the user of the interface 50 to see their current preference account selections. The save button 64 may allow the user of the interface 50 to save a number of preference selections that have been made during a session using the interface 50 to a storage device of some type such as a hard drive on a preference account server (see FIG. 3).

Figure 1B:
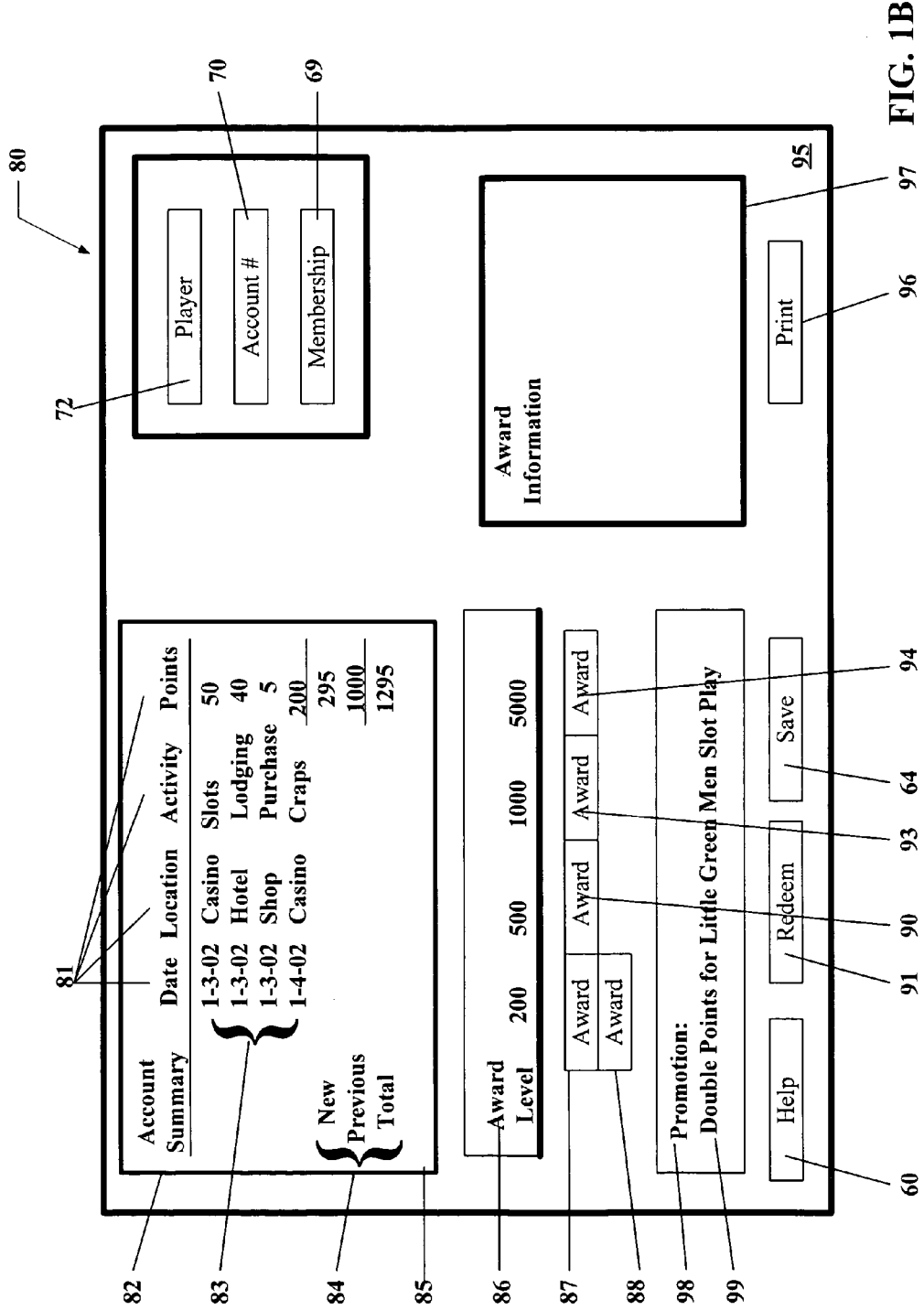
FIG. 1B is a block diagram of an interface for viewing a player preference account summary and redeeming awards.

FIG. 1B is a block of an interface 80 for viewing a player preference account summary and redeeming loyalty program awards. A player may be able to utilize interfaces with many different formats in the present invention. Thus, interface 50 (described in FIG. 1A) and interface 80 (described in FIG. 1B) have been described for illustrative purposes only and the present invention is not limited to the formats of these two interfaces. Further, a plurality of interface formats, including 50 and 80, may be available to a user of a preference account interface.

In 80, a player or a preference account administrator may be able to access a summary 82 of a player's loyalty point activity. In one embodiment, the summary may be accessed and viewed from a video display on a gaming machine (see FIG. 2). The summary 82 may include a number of loyalty point records 83. The loyalty point records 83 in the account summary 82 may be for a particular accounting period of a varying length such as a day, a week, a month, etc. Each loyalty point record may include of a number of fields 81, such as a date, a location, an activity and points awarded during the activity. Records for many types of activities that generate loyalty point awards, such as food purchases, entertainment purchases, lodging purchases, transportation purchases, merchandise purchases and game play, may be displayed in interface 80. For instance, on Jan. 3, 2002, the player played slots and earned 50 loyalty points, the player earned 40 loyalty points for their room purchase and the player earned 5 loyalty points for a merchandise purchase at a shop. The next day, Jan. 4, 2002, a player earned 200 loyalty points at a casino playing craps. The new, previous and total points 84 in the player's preference account are 295 loyalty points, 1000 loyalty points and 1295 loyalty points. Of course, these number are for illustrative purposes as their values may vary with time for a particular player and from account to account.

In 80, loyalty point award levels 86, such as two hundred, five hundred, one thousand and five thousand, may be displayed with awards, such as 87, 88, 90, 93 and 94 in each award level category. Typically, a value of an award corresponds to the number of loyalty points required to earn the award. Thus, award 94 in the five thousand loyalty point category will be more valuable than awards 87 and 88 in the two hundred loyalty point category.

By selecting an award button, such as 87, 88, 90, 93 and 94, a player may be able to find out additional information about the award in window 97. For instance, when the award is lodging, a player may be able to find out information about the lodging and availability of the lodging via window 97. In another example, when the award is a free meal, the player may be able to find a restaurant review in window 97.

When the player has accumulated enough loyalty points, a player may redeem one or more rewards using interface 80. For example, based upon the account summary information 82 displayed in interface 80 which shows the player has accumulated "1295 loyalty points," the player may be able to redeem one or more of awards, 87, 88, 90 and 93 with their "1295 loyalty points." For instance, the player may select an award corresponding to award button 93, which may be two free nights lodging at a casino, using the interface 80. When the player selects the redeem button 91, the award may be redeemed and the loyalty points may be deducted from the player's account. Another menu may appear that performs additional functions relating to the award such as allowing the player to make a reservation for the room and specifying a mailing address where the award may be sent. Further, the player may be able to obtain a hard copy of the account summary 82 and award redemption by printing out a record of some type to a printer using the print button 96.

In 80, a player may be notified of a various loyalty point promotions 98. The promotions may specify a number or range of loyalty points that a player may earn while participating in a particular event. The promotions may allow a gaming entity to promote various activities for a number of reasons such as to promote a new game being introduced at the casino or to encourage game play during specific periods of time. The promotions may vary with time. As an example of a promotion, a player may earn double loyalty points playing a "Little green men" slot game 99, i.e. twice the normal points a player would normally be awarded for participating in the activity. As another example, a player may earn double loyalty points (not shown) for activities at a casino during a certain time period.

Using the interface 80, a player may be able to enter and modify loyalty point account information using a number of loyalty point account settings (not shown). Examples of loyalty point account information that may modified or selected using interface 80 include a name (player) for the account, an address, contact information (e.g. phone numbers, fax numbers, e-mail addresses), tax information and preferred awards. The player or account administrator may enter and then save account information using the save button 64 in the interface 80.

User interfaces for modifying player preference accounts may displayed on many different types of computing devices such as a gaming machine, a personal digital assistant, a home computer, a kiosk located in a casino, a phone and a video display interface. In one embodiment, the video display interface may be a television monitor located in a hotel room. A touch screen, control pad or some other input device may be used with the television monitor to provide input to the preference account user interface.

The format of the user interface, such as 50 or 80, and the components comprising the user interface may vary according to the computing device on which the user interface is displayed. For instance, when the user interface 50 is displayed on a gaming machine the format of the interface may be different from when the interface is displayed on a personal digital assistant or phone. For example, using a home computer as the computing device, a player may be able to select many player preferences and view a large amount of account information at one time. However, when a phone is used as the computing device, a player may be only able to execute a limited number of commands, for example obtain an account summary, and view only a small amount of information at once. The number of interfaces, the format of the interfaces, the amount of information displayed on each interface, the type of information displayed, etc. on each interface is not limited to the interfaces, 50 and 80, described with respect to FIGS. 1A and 1B. Interfaces, 50 and 80, were described for illustrative purposes only.

A player playing a gaming machine customized to their own preferences may engage in longer gaming sessions than when playing on a non-customized gaming machine. Thus, an advantage of the interfaces described with reference to FIGS. 1A and 1B may be increased game playing satisfaction and hence prolonged player interest in game playing. Further, the ability to customize a player's game playing experience may reduce the amount of costly casino floor configurations performed by a casino. In addition, the ability to customize a loyalty point program and easily access loyalty point program information may increase a game player's satisfaction with these programs and encourage additional game play.

Figure 2:
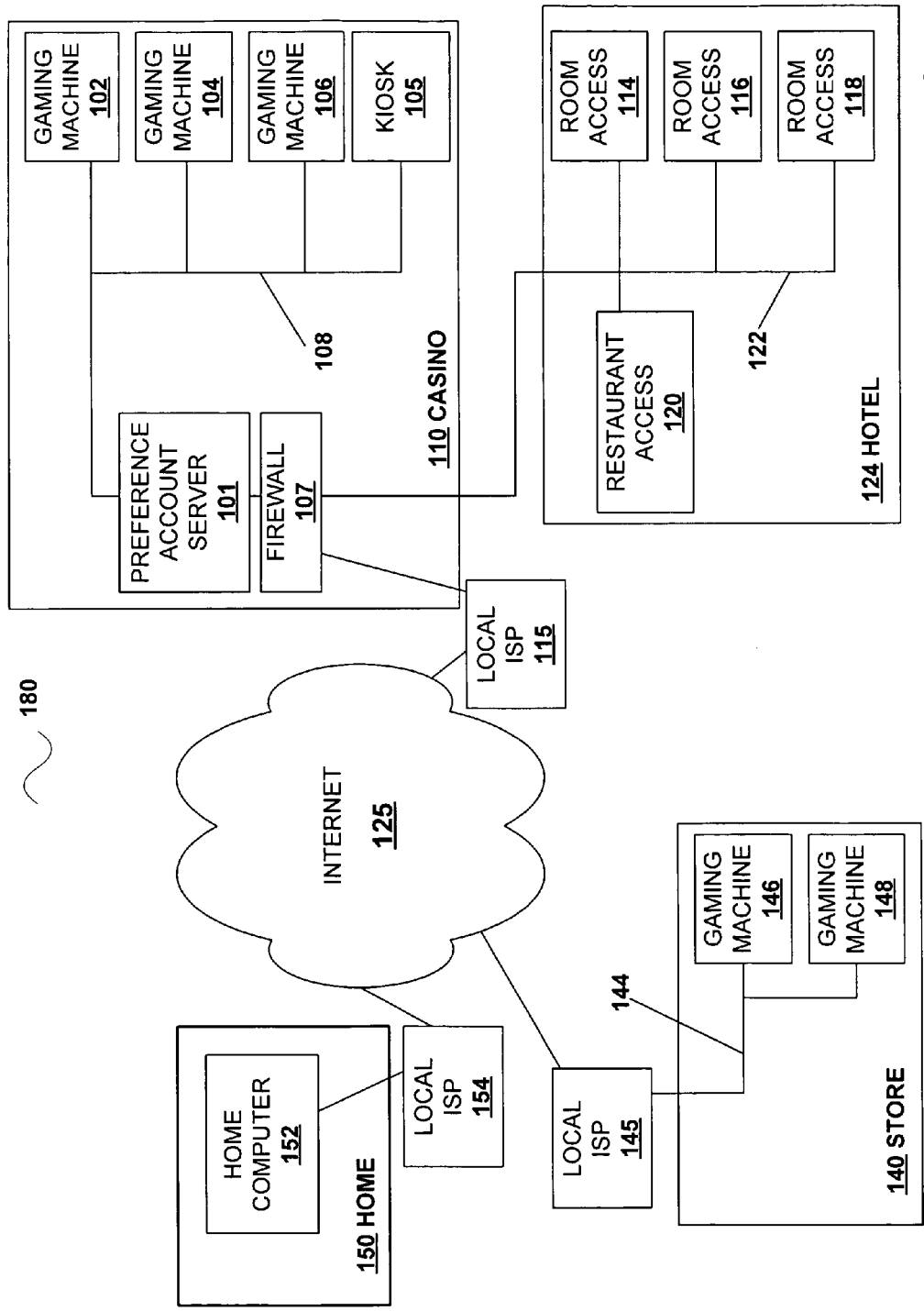
FIG. 2 is a block diagram of a preference account server connected to a number of local area and wide area networks.

FIG. 2 is a block diagram of a preference account server 101 connected to a number of local and wide area networks 180. As described above with respect to FIGS. 1A and 1B, user interfaces for modifying player preference accounts may displayed on many different types of computing devices such as a gaming machines (e.g. 102, 104, 106, 146, 148), a personal digital assistant, a home computer 152, a kiosk 105 located in a casino 110, a phone and a video display interface in a restaurant 120 or a hotel room (e.g. 114, 116 and 118) in a hotel 124. For instance, from the home computer 152 in a home 150, a player may access a player preference account stored on the preference account server 101 using an interface of some type. In one embodiment of the present invention, using the home computer 152, a person may access the preference account server using a web browser displaying an interface such as the interfaces described with reference to FIGS. 1A and 1B. Using a preference account interface via a web browser, a player may create or access a player preference account, may change preference account settings and may view preference account information such as loyalty point account information. To access the web interface, the home computer may connect with the preference account server using a connection to a local ISP (Internet Service Provider) 154 which is connected to the Internet 125. The preference account server 101 may support web access via a connection to the Internet 125 through a firewall 107 and a local ISP 115.

In other embodiments, preference account information may be accessed through a preference account interface displayed on a kiosk such as a kiosk 105 in a casino 110, a preference account interface displayed on video display in a hotel room such as video displays, 114, 116 and 118, in a hotel 124 or a video display in a restaurant such as restaurant access 120. The restaurant access 120 and room accesses, 114, 116 and 118 are connected to the preference account server 101 via a local area network 122. The kiosk 105 in casino 110 is connected to the preference account server 101 via a local area network 108. The local area networks 108 and 122 may be wireless networks, wired networks or combinations thereof. The preference account interface used with the restaurant access 120 and room accesses, 114, 116 and 118 may be obtained through a web browser but is not limited to web access. For example, video displays with set top boxes may be used to access preference account information stored on the preference account server 101 using a custom interface only available over the local area network.

In other embodiments, preference account information may be accessed through a preference account interface displayed on a gaming machine such as gaming machines 102, 104 and 106 in casino 110 or gaming machines, 146 and 148 in store 140. In casino 110, the gaming machines 102, 104 and 106 are connected to the preference account server 101, which supports the preference account interface, via the local area network 108. In the store 140, the gaming machines 146 and 148 may connect to a local ISP 145 and the Internet 125 via some communication means 144 such as a modem connected to a communication line (e.g. phone or cable) and then communicate with the preference server 101 via the preference account interface using an Internet connection. Again, the preference account interface may be used with a web browser although gaming machines of this invention are not limited to preference account interfaces using web access. When gaming machines, such as 146 and 148, are connected remotely to the preference account server over the Internet 125. A secure virtual private network may be used. Details of some embodiments of a virtual private network incorporating gaming machines are described with reference to U.S. application Ser. No. 09/732,650 entitled "Secured Virtual Network in a Gaming Environment" by Binh T. Nguyen which is incorporated herein by reference and for all purposes.

The firewall 107 may be hardware, software or combinations of both that prevent illegal access of the preference account server 101 and other devices connected to the preference account server 101, such as gaming machines 102, 104 and 106, by an outside entity. The firewall may be an external device such as 107, an internal device (see FIG. 3) or combinations thereof. An illegal access to the preference account server 101 may be an attempt to plant a program in the preference account server 101 that alters the operation of the server or allows someone to steal or illegally modify data. For example, a person may attempt to illegally redeem prizes from a loyalty point account or illegally add loyalty points to an account. The firewall may also be designed to prevent someone such as a hacker from gaining illegal access to the gaming machines connected to the preference account server 101 and tampering with them in some manner.

A game player using one of the gaming machines, 102, 104, 106, 146 or 148, may be able to view and modify preference account information using the preference account interface as previously described. As described above, the preference account information may be used to alter aspects of their game playing experience such as components of a video game presentation. Additional details of an interaction between a gaming machine 102, a kiosk 105 and a preference account server 101 are described with reference to FIG. 3.

Figure 3:
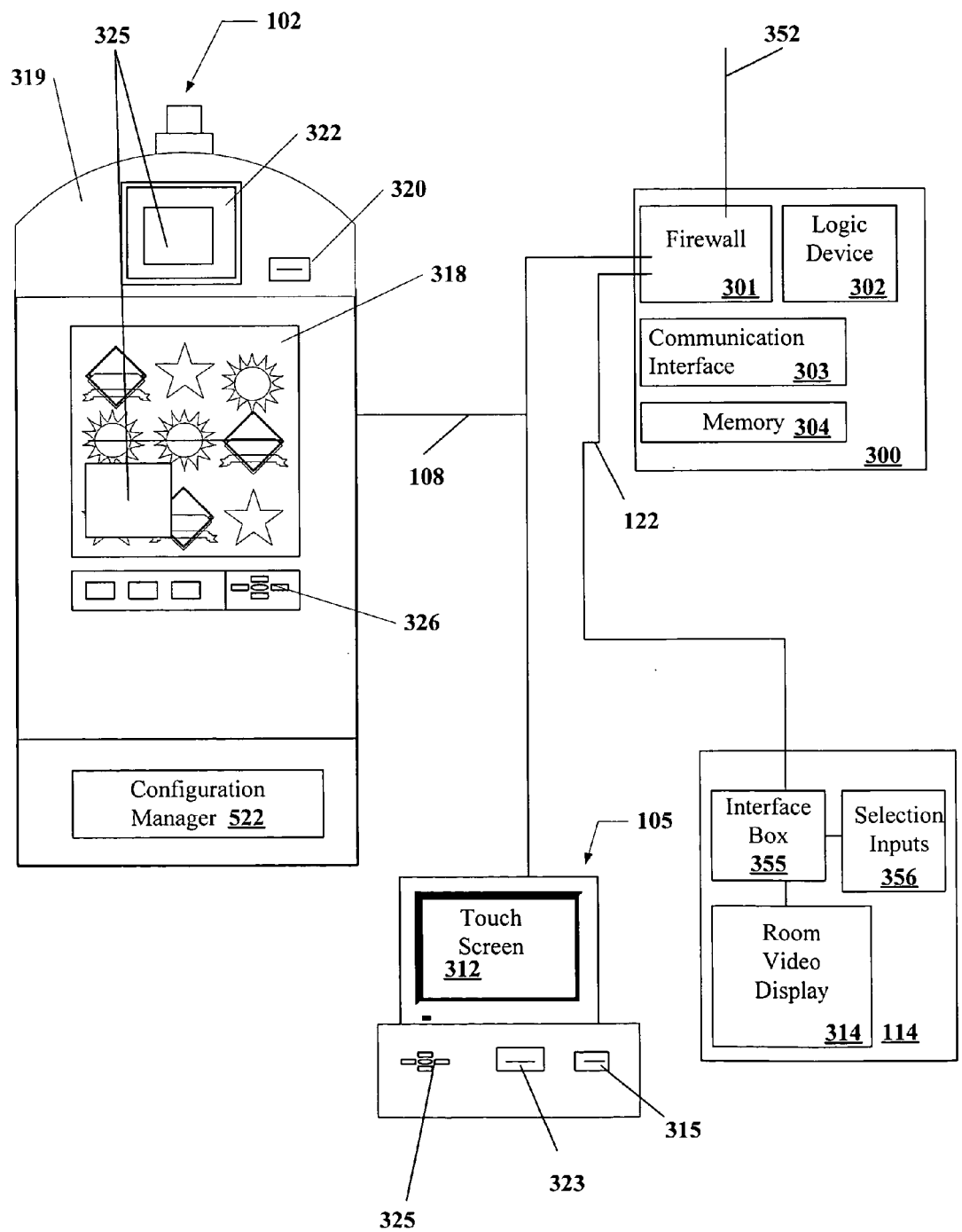
FIG. 3 is a block diagram of a preference account server connected to a gaming machine, kiosk and room display.

FIG. 3 is a block diagram of a preference account server 101 connected to a gaming machine 102, kiosk 105 and room access 114. A player may begin a game play session on the gaming machine 102 by entering identification information into the gaming machine 102 using an input interface of some type. The input interface may be a card reader 320, a video touch screen 318, selection inputs 326, a key pad, button pad, a mouse, a track ball, a touch pad, a joy stick, a wireless interface, a biometric input device and combinations thereof. The biometric input device may be one of but is not limited to a finger print reader, a retina scanner, a camera and a microphone.

Many different identification sequences are possible. For instance, a player may insert an account preference card into the card reader 320, which contains preference account information such as a player's name and an account. Next, the gaming machine 102 may request the player to enter additional identification information such as a numeric code or biometric information using an appropriate input device. The identification information entered during the identification sequence may be sent to the preference account server and compared with identification information stored on the preference account server. In another embodiment, the identification information may be compared with identification information stored on the account preference card entered into the card reader 320 without contacting the preference account server 101.

As another example of an identification sequence, the player may enter biometric information, such as a finger print pattern, using a finger print reader. The gaming machine may send the player's biometric information to the preference account server 101 or some other remote device. The preference account server 101 may receive the biometric information from the gaming machine 102 and determine the player's identity and preference account number. Next, the preference account sever 101 may send preference account information corresponding to a player's identity and account number to the gaming machine 102.

In the present invention, preference account information may be stored on a remote server such as a preference account server 101, a card such as a magnetic striped card or a smart card, or on a storage device located on the gaming machine. Thus, after a player's identity has been established, the gaming machine 102 may retrieve a portion or all of the preference account information from one or more sources storing preference account information. For instance, the gaming machine 102 may retrieve preference account information from a preference account card inserted in the card reader 320. As another example, the gaming machine 102 may retrieve preference account information stored on the gaming machine 102. In yet another example, the gaming machine 102 may retrieve preference account information from the preference account server 101. In a further example, the gaming machine may retrieve preference account information from the preference account card inserted in the card reader 320 and from the preference account server 101.

The retrieval of preference account information by the gaming machine 102 may be influenced by one or more player inputs. The player inputs may be received by the gaming machine 102 using one or more input devices including but not limited to a video touch screen 318, a button panel 326, a track ball, a mouse, a microphone, a card reader, a joy stick, a touch pad, a wireless interface, a key pad and combinations thereof. For example, in some embodiments, the gaming machine may ask the player for a confirmation input before the gaming machine reconfigures itself according to preference account information stored in the player's preference account. When the confirmation input has been received by the gaming machine, the reconfiguration of the gaming machine using the preference account information may be performed by a configuration manager 522 (see FIG. 4 for more details of the configuration manager) on a master gaming controller (not shown) within the gaming machine 102. For instance, when the preference account information received by the gaming machine 102 includes a gaming machine volume setting, the volume of audio output on the gaming machine 102 may be readjusted. As another example, when the preference account information received by the gaming machine is for a preferred game, the gaming machine may load the preferred game from a storage device on the gaming machine or may download the preferred game from a remote game server.

In other embodiments, the gaming machine 102 may automatically reconfigure itself, using the configuration manager 522, according to preference account information stored in the player's preference account without the confirmation input by the player. In another example, the player may request to view or modify particular preference account information. In this case, the gaming machine may retrieve the requested preference account information from the source where it is located and display the requested preference account information using a preference account interface such as 325. The preference account interface may be displayed on a primary display such as 318 integrated into the main cabinet of the gaming machine 102 or a secondary display, such as 322, in a top box 319 mounted on top of the gaming machine 102.

The gaming machine 102 may receive a plurality of different requests for preference account information from a player where the preference account information contained in each request is different. The different preference account requests may occur during a single session of game play on the gaming machine 102. For instance, in a first request for preference account information, a player may wish to view a loyalty point account summary over a first period time covered by the loyalty point account. In the first request, the gaming machine 102 may retrieve the requested information from one or more sources storing preference account information and display it on a preference account interface such as 325. In a second request for preference account information in the same session, a player may wish to view a loyalty point summary over a second period of time different from the first period of time. The gaming machine may retrieve the requested information from one or more sources in the second request and display it on a preference account interface such as 325.

When the gaming machine 102 retrieves preference account information from the preference account server 101, the master gaming controller (not shown) that is designed or configured to control one or more games played on the gaming machine 102 may send a request to the remote server 101 using a communication interface within the gaming machine (not shown) connected to local area network 108. The request for one or more different portions of preference account information may be encapsulated in one or more messages of some type. The gaming machine 102 may also send messages to the preference account server 101 that include preference account information to be stored in the preference account server 102 or include commands for the preference account server 101 to execute. For instance, as described with reference to FIGS. 1A and 1B, when using the preference account interface, a player may request particular information (e.g. a help request) in regards to using the preference account interface. In other example, a player may request one or more modifications be made to their preference account information to be stored to the preference account server 101.

The preference account server 101 may receive the one or more messages via a communication interface 303 connected to a firewall 301. The messages may be received from a gaming machine, such as 102, a kiosk, such as 105 or a room access interface, such as 114. A logic device 302 within the preference account server 101 may be designed or configured to execute one or more software applications that allow preference account information to be input into a plurality of different preference accounts. In addition, the logic device may designed or configured to execute software applications that allows preference account information stored in a plurality of different preference accounts to be modified from an external device such as the gaming machine 102, the kiosk 105 or the room access interface 114. The preference account information may be stored on a memory 304 of some type located in the preference account server 101. For instance, the memory 304 may be a hard drive or some other appropriate storage medium. The communication interface 303 may connect to one or more local area networks, such as 108 or 122, and a wide area network 352 such as the Internet. At least one of the software applications executed by the logic device 302 may allow the preference account server 101 to simulate a game presentation for a plurality of games using a plurality of different preferred game features as described with reference to FIG. 1A. Another one of the software applications may allow the account preference server to generate one or more preference account interfaces. In some embodiments, the preference account interfaces generated by the preference account server 101 may be accessed via a web browser.

The preference account server 101 and preference account information stored on the preference account server may be accessed and modified via the kiosk 105 and the room access interface 114. For kiosk 105, a player may view and modify preference account information stored on the preference account server 101 using a touch screen, selection inputs 325 and a card reader 315. For room access interface 114, a player may view and modify preference account information stored on the preference account server 101 using an interface box 355 connected to selection input 356 and a room video display 314. For both the kiosk 105 and the room access interface 114, a player preference account interface may be displayed to a video display such as 312 and 314. Using kiosk 105, a user may print account preference account information using the printer 323. In addition, a player may store preference account information to a magnetic striped card or a smart card inserted into the card reader 315. Other input devices that may be used with a kiosk 105 or a room access interface 114 include but are not limited to a button panel, a track ball, a mouse, a microphone, a card reader, a joy stick, a touch pad, a wireless interface, a key pad and combinations thereof.

Figure 4:
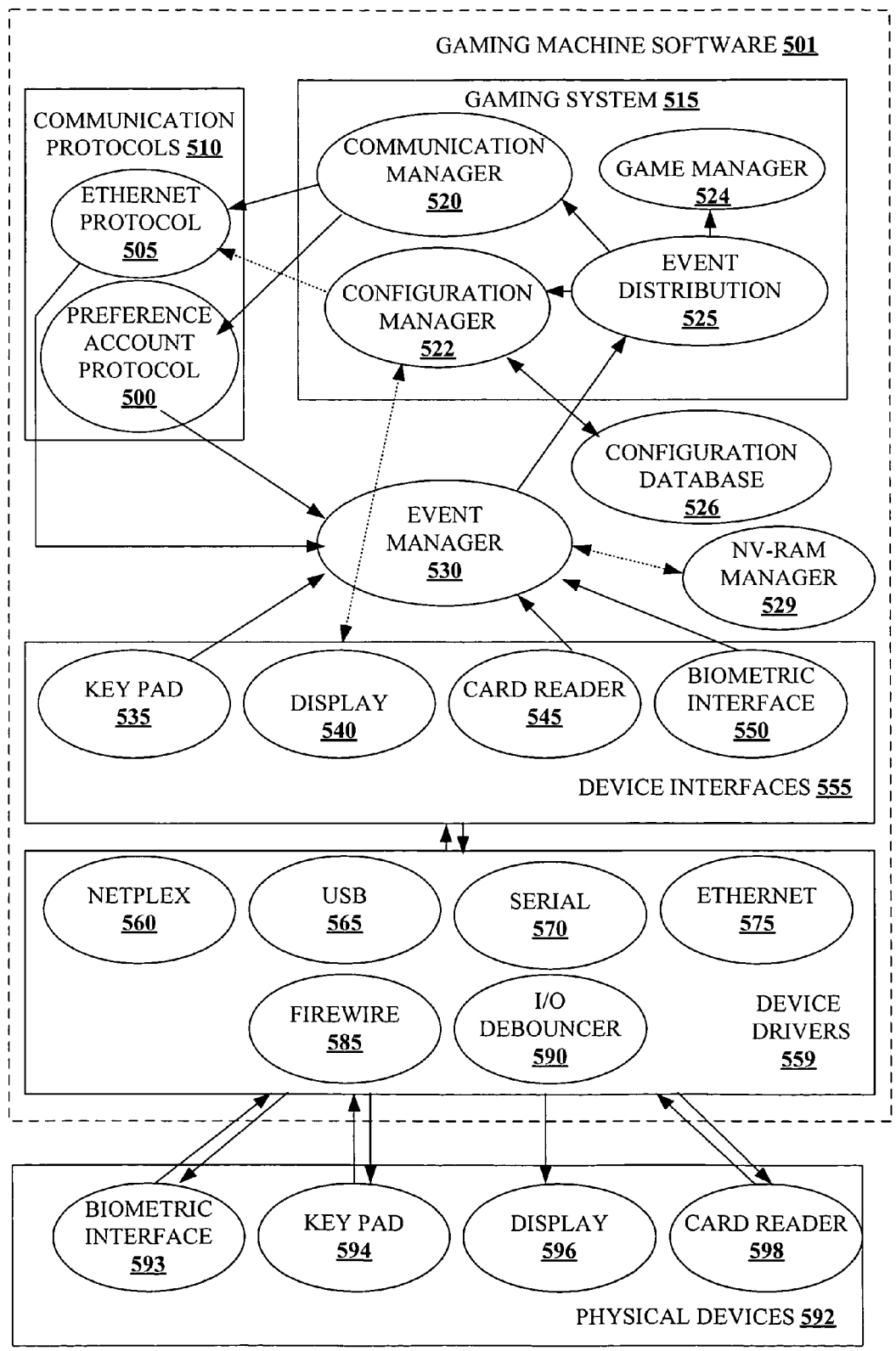
FIG. 4 is a block diagram depicting a software architecture for a gaming machine providing preference account services.

FIG. 4 is a block diagram of a gaming machine software architecture 501 allowing a gaming machine to be reconfigured to implement various player preferences for one embodiment of the present invention. Various hardware and software architectures may be used to implement this invention and are not limited to the architecture described with respect to FIG. 4. The gaming machine software 501 is connected to the physical devices 592 which may be used to obtain preference account information, to obtain account identification information, to display preference account interfaces and provide preference account services. The software player tracking units may be loaded into the memory of the master gaming controller at the time of initialization of the gaming machine.

The main parts of the gaming machine software 501 are communications protocols 510, a gaming system 515, an event manager 530, device interfaces 555, and device drivers 559. The device drivers 559 communicate directly with the physical devices including a biometric interface 593 (e.g. a finger printer reader, retina scanner, camera, etc.), a key pad 594, a display 596, a card reader 598 or any other physical devices that may be used to provide preference account services and other related gaming services.

The device drivers 559 utilize a communication protocol of some type that enable communication with a particular physical device. The device driver abstracts the hardware implementation of a device. For example, a device driver may be written for each type of card reader that may be potentially connected to the gaming machine. Examples of communication protocols used to implement the device drivers 559 include Netplex 560, USB 565, Serial 570, Ethernet 575, Firewire 585, I/O debouncer 590, direct memory map, serial, PCI 580 or parallel. Netplex is a proprietary IGT standard while the others are open standards. For example, USB is a standard serial communication methodology used in the personal computer industry. USB Communication protocol standards are determined by the USB-IF, Portland, Oreg., "www.usb.org."

The device drivers may vary depending on the manufacturer of a particular physical device. For example, a card reader 598 from a first manufacturer may utilize Netplex 560 as a device driver while a card reader 598 from a second manufacturer may utilize a serial protocol 570. Typically, only one physical device of a given type is installed into the gaming machine at a particular time (e.g. one card reader). However, device drivers for different card readers or other physical devices of the same type, which vary from manufacturer to manufacturer, may be stored in memory on the gaming machine. When a physical device is replaced, an appropriate device driver for the device is loaded from a memory location on the gaming machine allowing the gaming machine to communicate with the device uniformly.

The device interfaces 555, including a key pad 535, a display 540, a card reader 545, and a biometric interface 550, are software units that provide an interface between the device drivers and the gaming system 515. The device interfaces 555 may receive commands from the software configuration 522 requesting an operation for one of the physical devices. As an example, the configuration manager 522 may send a series of commands to the display interface 540 that allows a preference account interface of some type be displayed on the display 596. The dashed arrow from the configuration manager 522 to the device interfaces 555 indicates a command being sent from the configuration manager 522 to the device interfaces 555. The display interface 540 sends the one or more commands or messages to the device driver for the display 596. The device driver for the display communicates the commands and messages to the display 596 allowing the display 596 to display the preference account interface.

The device interfaces 555 may also receive preference account events from the physical devices. The device driver can poll a device routinely for input or preferably is notified via an interrupt signal. The solid black arrows indicate event message paths between the various software units. For example, when a card containing preference account information is inserted into the card reader 598, the card reader device interface 545 receives a message via one of the device drivers 559 indicating the card has been inserted into the card reader 598, i.e. a "card-in" message. When using the interrupt method, the message is sent directly to the card reader device interface 545. When using the polling method, the message is sent in response to a query by the card reader device interface such as "has a card been inserted?" Typically, the device drivers 559 do not perform any high level event handling. As another example, when a player places their finger on a platen of a finger print reader for identification purposes, the biometric interface 550 receives a message via one of the device drivers 559 indicating an object has be placed over the finger print reader i.e. a "platen covered," message.

Typically, a preference account event and other events generated by the gaming machine software 501 are an encapsulated information packet of some type posted by the device interface. The preference account event is created when input is detected by one of the device interfaces 555. The events are distributed through a queued delivery system which is described below in more detail in the U.S. application Ser. No. 09/642,192 by LeMay et al., entitled, "Gaming Machine Virtual Player Tracking and Related Services," which is incorporated herein in its entirety and for all purposes. In addition, further details of the gaming machine software 501 are described in the LeMay, et al., reference. Each event contains a standard header with additional information attached to the header. The additional information is typically used in some manner at the destination. For example, the "card-in" event may contain preference account information such as a player's preference account number which may be received by the configuration manager 522 and sent to a preference account server outside of the gaming machine.

Once a device interface 555 has received a player tracking event or some other event from a physical device 592, the event is posted to the event manager 530. The event manager 530 is typically a shared resource that is utilized by all of the software applications in the gaming system 515 including the configuration manger 522, a game manager 524 and a communication manager 520. The event manager 530 evaluates each event to determine whether the event contains critical information that is protected from power hits on the gaming machine. Events containing critical information may be sent to the non-volatile memory manager 529 for storage in non-volatile memory. The non-volatile memory manager 529 may also be shared by other applications.

The source of an event, which may be a device interface 555 or a server outside of the gaming machine, is not usually directly connected to the event destination. Thus, the event manager 530 acts as an interface between the event source and the one or more event destinations. After the source posts the event, the source returns back to performing its intended function. For example, the source may be a device interface polling a hardware device. The event manager 530 processes the event posted by the source and places the event in one or more queues for delivery.

After an event is received by the event manager 530, the event may be sent to event distribution 525 in the gaming system 515. Event distribution 525 broadcasts the event to the software units that may operate on the event. For example, when a player enters an identification code using the key pad 594, this event may arrive at the configuration manager 522 after the event has passed through the device drivers 559, the key pad device interface 535, the event manager 530, and the event distribution 525. After receiving an event, the configuration manager 530 evaluates the event and determines whether a response is required to the event. Thus, one function of configuration manger may be as a preference account event evaluator. In response to an event, the software configuration manager unit may 1) generate a new event and post it to the event manager 530, 2) send a command to the device interfaces 555, 3) send a command or information to a preference account communication protocol 500 or an Ethernet protocol so that the information may be sent outside of the gaming machine, 4) do nothing or 5) perform combinations of 1), 2) and 3).

When an event is distributed, it may be distributed to a plurality of software units within the gaming machine system 515 as well as software units located outside of the gaming machine for evaluation. For example, when a preference account event occurs it may be sent to the configuration manager unit 522 which evaluates the event and in parallel the event may be sent to the communication manager 520 which sends the events to the communication protocol software 510, including the Ethernet protocol or the preference account protocol 500. Using an appropriate communication protocol, the preference account event may be sent to a preference account server located outside of the gaming machine so that the event may be evaluated by a preference account software unit located on the preference account server.

The communication protocols typically translate information from one communication format to another communication format. For example, a gaming machine may utilize one communication format while a server providing preference account services may utilize a second communication format. The preference account protocol 500 translates the preference account information from one communication format to another allowing information to be sent and received from the server. Additionally, the preference account server, located outside of the gaming machine, may send events via the preference account protocol 500 which are sent to the event manager 530. For instance, the preference account server may send one or messages containing preference account information relating to gaming machine setting and game feature settings as events to the event manager 530. In one embodiment of the present invention, the preference account information may be sent to the gaming machine by the preference account server in response to a request for preference account information generated by the configuration manager 522. The configuration manager 522 may receive the one or more event messages from the preference account via the event manager 530 and the event distribution 522. The event messages may contain preference account information.

The preference account information received from the preference account server may be used by the configuration manager 522 to reconfigure the gaming machine according to one or more player preferences. For instance, when the player preference is a volume setting on the gaming machine, the configuration manger 522 may adjust the audio output setting on the gaming machine that are used by the game manager 524. In another example, the configuration manager 522 may adjust a game feature setting such as a background color scheme for a typical game used by the game manager 524. Game feature settings for different games corresponding to a plurality of game feature selections selected by a player may be stored in a configuration database 526 on the gaming machine. In some embodiments, an external device to the gaming machine may store the configuration database 526 and download configuration information to the gaming machine.

Figure 5:
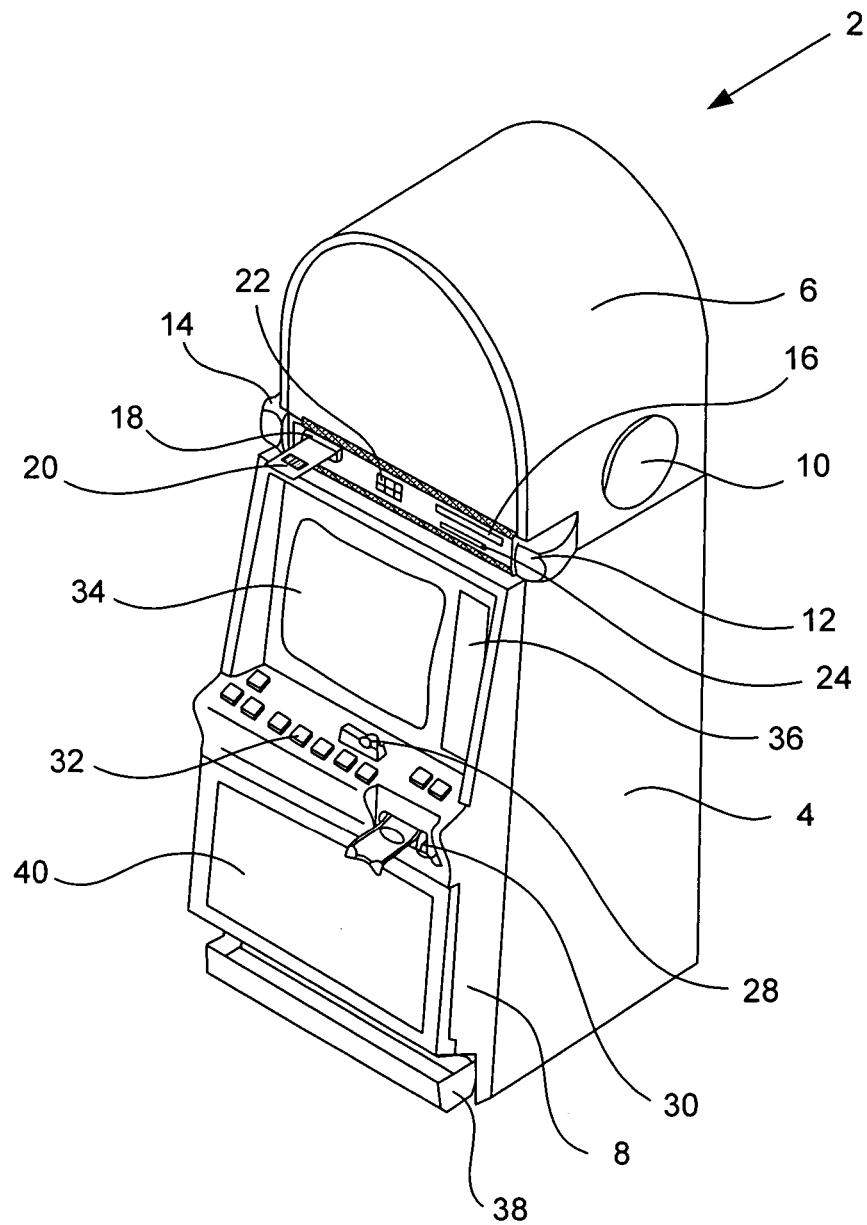
FIG. 5 is a perspective drawing of one embodiment of a gaming machine of the present invention.

Turning to FIG. 5, a video gaming machine 2 of the present invention is shown. Machine 2 includes a main cabinet 4, which generally surrounds the machine interior (not shown) and is viewable by users. The main cabinet 4 includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The display monitor 34 will typically be a cathode ray tube, high resolution flat-panel LCD, or other conventional electronically controlled video monitor and may include touch screen capabilities. The information panel 36 may be a back-lit, silk screened glass panel with lettering to indicate general game information including, for example, the number of coins played. The bill validator 30, player-input switches 32, video display monitor 34, and information panel are devices used to play a game on the game machine 2. The devices are controlled by circuitry such as the master gaming controller (not shown) housed inside the main cabinet 4 of the machine 2. Many possible games, including traditional slot games, video slot games, video poker, video pachinko, video black jack, video card games and video keno, may be provided with gaming machines of this invention.

The gaming machine 2 includes a top box 6, which sits on top of the main cabinet 4. The top box 6 houses a number of devices, which may be used to add features to a game being played on the gaming machine 2, including speakers 10, 12, 14, a ticket printer 18 which prints bar-coded tickets 20, a key pad 22 for entering player tracking information or preference account information, a florescent display 16 for displaying player tracking information or preference account information and a card reader 24 for entering a magnetic striped card containing player tracking information. Further, the top box 6 may house different or additional devices than shown in the FIG. 5. For example, the top box may contain a bonus wheel, a secondary video display or a back-lit silk screened panel which may be used to add bonus features to the game being played on the gaming machine. During a game, these devices are controlled and powered, in part, by circuitry such as the master gaming controller (not shown) housed within the main cabinet 4 of the machine 2.

Understand that gaming machine 2 is but one example from a wide range of gaming machine designs on which the present invention may be implemented. For example, not all suitable gaming machines have top boxes or player tracking features. Further, some gaming machines have two or more game displays—mechanical and/or video. And, some gaming machines are designed for bar tables and have displays that face upwards. Those of skill in the art will understand that the present invention, as described below, can be deployed on most any gaming machine now available or hereafter developed.

Returning to the example of FIG. 5, when a user wishes to play the gaming machine 2, he or she inserts cash through the coin acceptor 28 or bill validator 30. Additionally, the bill validator may accept a printed ticket voucher which may be accepted by the bill validator 30 as an indicia of credit. During the game, the player typically views game information and game play using the video display 34. The player may also access a preference account interface using the video display 34.

Prior to initiating game play, the player may enter preference account information using the card reader 24, the keypad 22, and the florescent display 16. As another example, the player may enter preference account information using the card reader 24 and the video display 34 where the video display may be used as a touch screen to enter preference account information such as player identification information. Additional identification information from the player may be obtained from one or more biometric input devices (not shown) such as a finger print reader, a retina scanner or a camera. The camera may be used with feature recognition software on the gaming machine or a remote server to identify the player.

After a player has been identified, using one or more input devices a player may view and/or modify preference account information via the preference account interface displayed on the video display 34. In addition, the gaming machine may reconfigure itself according to a number of player preferences. The player preferences may be incorporated as part of a game play on the gaming machine.

During the course of a game, a player may be required to make a number of decisions, which affect the outcome of the game. For example, a player may vary his or her wager on a particular game, select a prize for a particular game, or make game decisions which affect the outcome of a particular game. The player may make these choices using the player-input switches 32, the video display screen 34 or using some other device which enables a player to input information into the gaming machine. Certain player choices may be captured by preference account software loaded in a memory inside of the gaming machine. For example, when a betting preference has not been specified by the player, the betting preferences of a player during a game play session may be captured by the preference account software. The information captured by the preference account software may be used to modify a player's preference account information according to game play preferences exhibited by the player during one or more game play sessions.

During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2 or from lights behind the belly glass 40. In some embodiments, a player may be able to select preferred video and audio effects that are incorporated into a game presentation as described with reference to FIGS. 1A and 1B. After the player has completed a game, the player may receive game tokens from the coin tray 38 or the ticket 20 from the printer 18, which may be used for further games or to redeem a prize. Further, the player may receive a ticket 20 for food, merchandise, or games from the printer 18. The type of ticket 20 may be related to past game playing recorded by the player tracking software within the gaming machine 2. In some embodiments, these tickets may be used by a game player to obtain game services.

Figure 6:
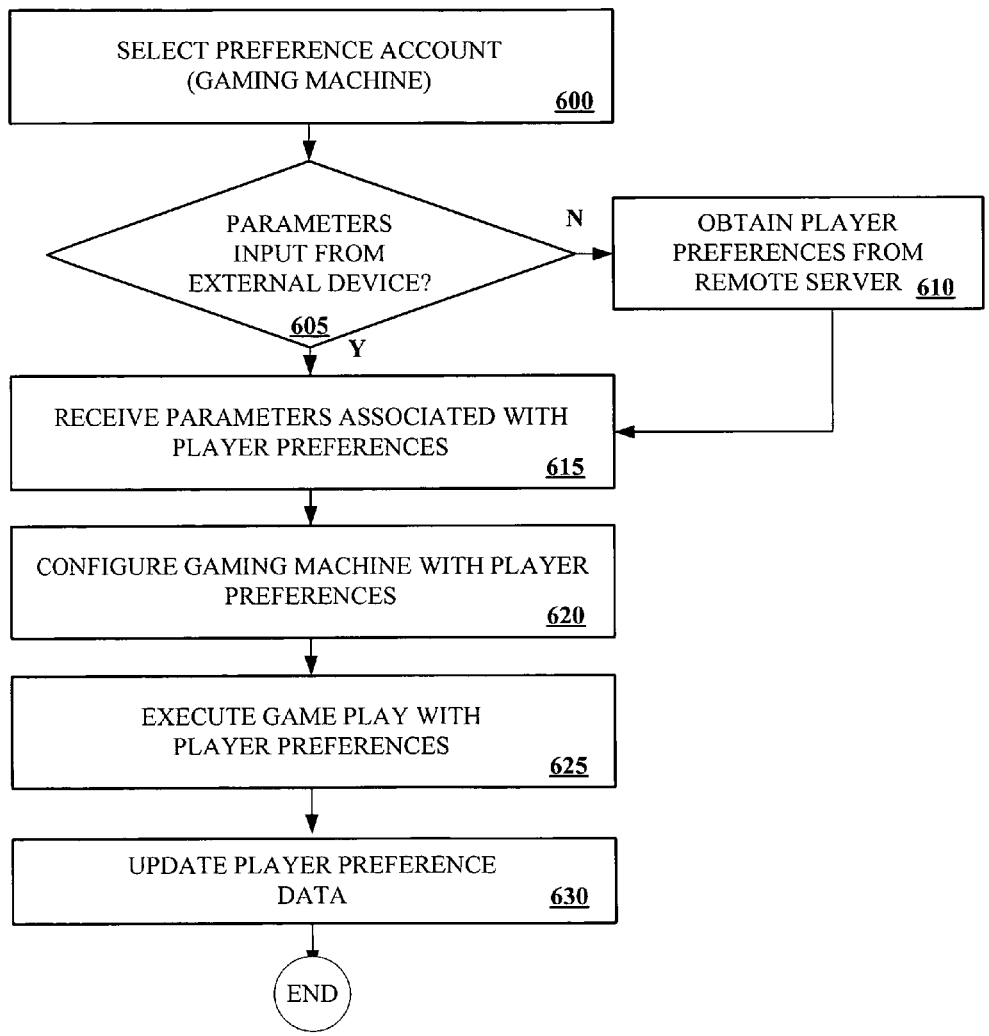
FIG. 6 is a flow chart depicting an implementation of a preference account methodology on a gaming machine for one embodiment of the present invention.

FIG. 6 is a flow chart depicting an implementation of a preference account methodology on a gaming machine for one embodiment of the present invention. In 600, the gaming machine selects a preference account. After receiving a request to access a preference account, the selection of the preference account and authentication of the request may be based upon player identification information entered by the player into the gaming machine in some manner. For instance, player identification information may be entered as a alpha-numeric code entered into the gaming machine, biometric information entered into the gaming machine or combinations thereof. In 605, the gaming machine may determine whether preference account information used to reconfigure the gaming machine was received from an external device such as from a smart card inserted into a card reader on the gaming machine or from another input device (e.g. a touch screen) connected to the gaming machine. The preference account information may include but is not limited to loyalty point information, loyalty point account settings, promotional opportunities, preferred games, preferred game features for the preferred games, preferred gaming machine settings, preferred bonus games and preferred progressive games as described with reference to FIGS. 1A and 1B. In 610, when the gaming machine is connected to a remote preference account server, the gaming machine may send a request for a portion of preference account information from the remote preference account server and receive the requested preference account information from the remote server. In some embodiments, during a single game play sequence by the same player, the gaming machine may make multiple requests to the remote server requesting different portions of the preference account information stored on the remote server.

In 615, the gaming machine may receive preference account information describing one or more selected player preferences from an external device, a remote server or combinations thereof. In 620, the gaming machine may reconfigure itself according to the selected player preferences described in the preference account information. For instance, a level of audio output on the gaming machine may be adjusted according to a preferred volume setting selected by the player, a preferred bonus game may be loaded into a memory on the gaming machine for execution during game play and the gaming machine may be configured to a preferred game denomination selected by the player such as 0.07 US dollars. In 625, a game play on the gaming machine may be executed with the player preferences.

In 630, player preference account data may be updated. For instance, during a game play session on the gaming machine where a player plays a series of games, preference account software on the gaming machine may record one or more characteristics of the player's game play during the game play session such as the amount wagered on each game or the speed at which the player plays a game. The characteristics may be used to update preference account information for the player. For example, the rate at which a player plays the game may be used to adjust a game presentation speed on the gaming machine stored in a player's preference account. Thus, the update of the preference account information may occur without a direct input by the player. In another example, a player may request to view and modify preference account information using a preference account interface displayed on the gaming machine in some manner. After modification of the preference account information, the information may be stored to an external storage unit such as a smart card, a magnetic striped card, a paper print-out, a remote server, a personal digital assistant and combinations thereof.

Figure 7:
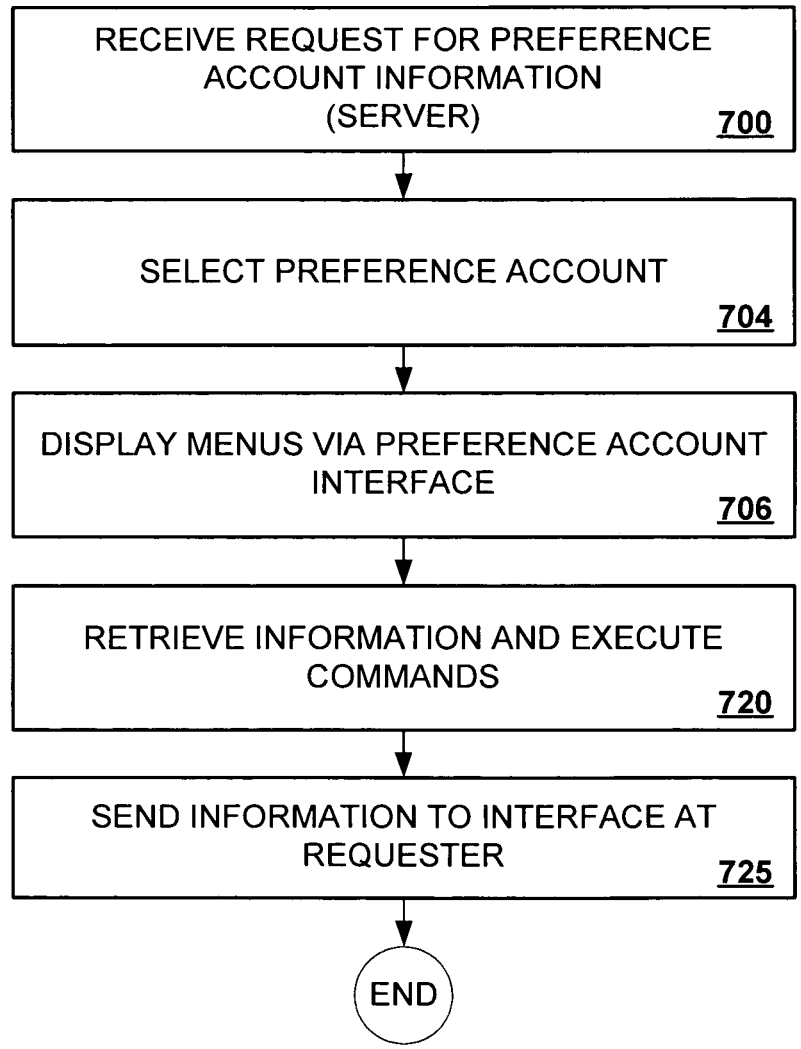
FIG. 7 is a flow chart depicting an implementation of a preference account methodology on a preference account server for one embodiment of the present invention.

FIG. 7 is a flow chart depicting an implementation of a preference account methodology on a preference account server for one embodiment of the present invention. In 700, a preference account server, which may be a device separate from a gaming machine or a gaming machine with server capabilities, may receive a request for preference account information. The request for preference account information may be made from a number of different devices external to the preference account server such as a gaming machine, a home computer, a casino kiosk, a personal digital assistant, a phone and a video display interface. In some embodiments, the video display interface may be located in a hotel room or a restaurant.

In 704, the preference account server may select a particular preference account using player identification information supplied to the preference account server by the requesting external device. The identification information may include but is not limited to biometric information, alpha-numeric input codes, a player's name, a player's account number and combinations thereof. The player identification information may be used to authenticate the request for preference account information.

In 706, one or more menus may be displayed to a preference account interface used by the external device by the preference account server. The menus may allow a user of the preference account interface to view and modify preference account information stored on the preference account server. In some embodiments, the preference account interface may be accessed via a web browser.

In 720, the preference account server may retrieve preference account information and execute commands operating on preference account information that are available through the one or more preference account interfaces (e.g. see FIGS. 1A and 1B). For instance, the commands may allow a user of the preference account interface to add, delete and store preference account information on the preference account server. As another example, a user of the interface may be able to simulate one or more game presentations, including audio and video effects, from one or more games such as video poker games, video slot games, video blackjack games, video pachinko games, video card games and video games of chance. The game presentations may be modified according to one or more preference options selected by the player. The game presentations simulated via the interface may allow a player to assess how various selected preference options will affect their game playing experience.

In 725, the preference account server may send the requested preference account information to the external device requesting the preference account information. For instance, the requested information may be a summary of a player's loyalty point account over a certain time period. While the player is using the preference account interface hosted by the preference account server, a player may make multiple requests for preference account information via the preference account interface. Thus, 700, 704, 706, 720 and 725 may repeated a plurality of times by the same player during a single session of using the interface, over multiple different sessions by the same player and over multiple sessions by different players. A single session may defined as the time period between when a user is granted access to a preference account, such as by entering player identification information, and when a player's access to the preference account is terminated. Thus, a second subsequent session to a first session begins after a player's access has been terminated in the first session and a new access to a player, which may be the same or a different player than in the first session, has been granted in the second session.

Figure 8:
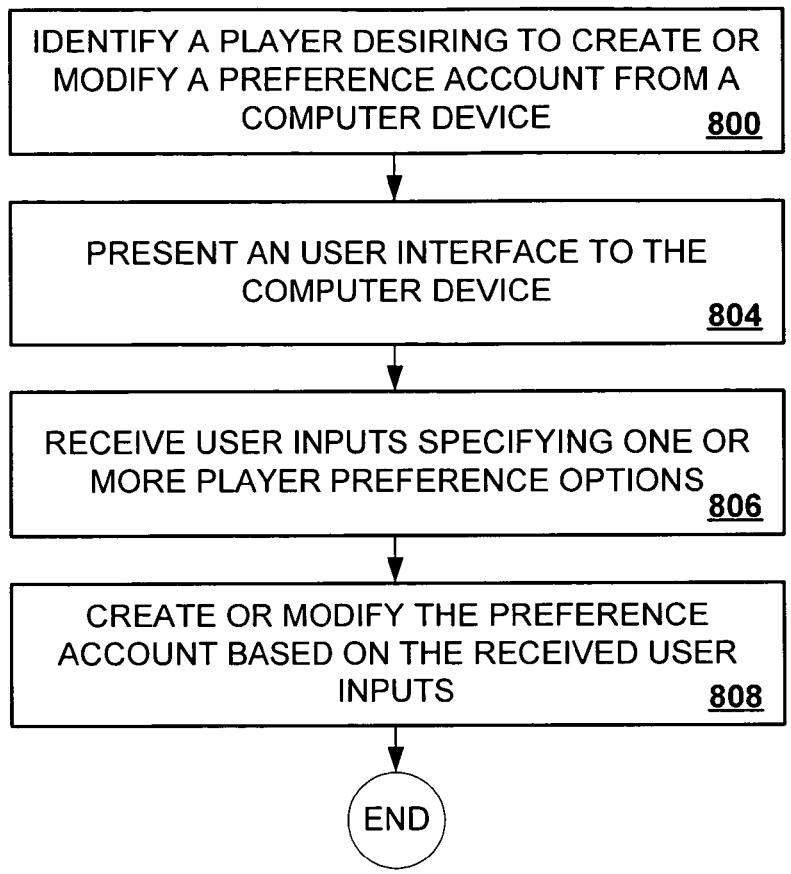
FIG. 8 is a flow chart depicting a method of creating or modifying a preference account.

FIG. 8 is a flow chart depicting a method of creating or modifying a preference account. In some embodiments, the preference account and preference account interfaces may be hosted by a remote device, external to a group of gaming machines, such as a preference account server. In other embodiments, preference accounts and preference account interfaces may be hosted by a gaming machine with preference account server capabilities. In 800, a player desiring to create or modify a preference account stored from a computer device may be identified. The player may be identified by information that the player inputs into the computer device using an input device of some type such as a biometric input device. The computer device may be a gaming machine, a home computer, a casino kiosk, a personal digital assistant, a phone or a video display interface. Thus, a particular preference account may be potentially accessed from many different types of devices at many different locations.

In 804, a preference account user interface may be presented on the computer device. The preference account interface may be used to display and receive preference account information. The preference account information may include but is not limited to loyalty point information, loyalty point account settings, promotional opportunities, preferred games, preferred game features for the preferred games, preferred gaming machine settings, preferred bonus games and preferred progressive games as described with reference to FIGS. 1A and 1B. In some embodiments, the preference account interface and preference account information may be accessed via a web browser.

In 806, via one or more preference account interfaces hosted on one of the computer devices, the preference account server may receive user inputs specifying one or more player preference options that are available to a player through their preference account. The user inputs may modify previously specified preference account options or in the case of a new account specify preference account options for the first time. In some embodiments, new preference accounts may be created with preference account information pre-specified according to one or more templates. The templates may be based upon a player's game playing habits obtained from other sources such as player tracking or may be based upon an analysis of game playing habits of one or more demographic groups such as age, income, gender, etc. The preferences of one or more demographic groups which a player fit into may used to generate an initial preference account template for the player.

When the preference account information is pre-specified, a player modifying their preference account for the first time may modify information already generated from a preference account template. In 808, the preference account server may create a new preference account or modify the preference account based upon the received user inputs and store it in a memory for archival purposes and later retrieval. In addition, the preference account server may simulate a game presentation using preference account information specified by the user.

Although the foregoing invention has been described in some detail for purposes of clarity of understanding, it will be apparent that certain changes and modifications may be practiced within the scope of the appended claims. For instance, while the gaming machines of this invention have been depicted as having gaming devices physically attached to a main gaming machine cabinet, the use of gaming devices in accordance with this invention is not so limited. For example, the display screen features which may be provided on a top box may be included in a stand alone cabinet proximate to, but unconnected to, the main gaming machine chassis.

What is claimed is:

1. A method comprising:

receiving, at a gaming machine, while the gaming machine is available for game play, an input from a player indicating a selection of one of (i) a first game of chance including a first progressive jackpot wherein first odds of winning the first progressive jackpot are fixed and (ii) a second game of chance including a second progressive jackpot to be played as a game of chance on the gaming machine wherein second odds of winning the second progressive jackpot are fixed, wherein at least one of the first progressive jackpot and the second progressive jackpot is a personal progressive jackpot customized for the player, the personal progressive jackpot being customized in response to a second selection, by the player, from a group of types of progressive games, of a particular game type, the group of types consisting of video slots games, slot games, video poker games, video black jack games, video pachinko games, video card games, video keno games and video games of chance;

in response to receiving the first selection and the second selection, downloading software to generate the selection of the first game of chance or the second game of chance from a first remote device, downloading configuration information from the first remote device, configuring the software and the gaming machine using the configuration information to allow play of the game of chance that is selected;

receiving a wager on the game of chance;

determining an outcome for the game of chance;

sending to a second remote gaming device information to allow a portion of the wager to be contributed to one of the first progressive jackpot or the second progressive jackpot that is selected.

2. The method of claim 1, wherein the first progressive jackpot or the second progressive jackpot is a wide area progressive jackpot.

3. The method of claim 1, wherein the a user interface is customized on the gaming machine according to preference account information of the player.

4. The method of claim 1, further comprising: displaying a first amount for the first progressive jackpot and a second amount for the second progressive jackpot.

5. The method of claim 1, further comprising: displaying a first amount for the first progressive jackpot or a second amount for the second progressive jackpot.

6. The method of claim 1, wherein the input indicating the selection is received from a third remote gaming device.

7. The method of claim 1, wherein the input indicating the selection is received via a player tracking device coupled to the gaming machine.

8. The method of claim 1, further comprising: receiving from the second remote gaming device an amount for the first progressive jackpot, an amount for the second progressive jackpot or combinations thereof.

9. The method of claim 1, further comprising: prior to receiving the selection, displaying information regarding the first game of chance including the first progressive jackpot and the second game of chance including the second progressive jackpot.

10. The method of claim 1, wherein the gaming machine is coupled to one or more of a wide area progressive network, a casino area network or combinations thereof.

11. A gaming machine comprising:

a master gaming controller configured to:

1) control a play of a game of chance;

2) receive, while the gaming machine is available for game play, an input from a player indicating a selection of one of (a) a first game of chance including a first progressive jackpot wherein first odds of winning the first progressive jackpot are fixed and (b) a second game of chance including a second progressive jackpot to be played as the game of chance on the gaming machine wherein second odds of winning the second progressive jackpot are fixed, wherein at least one of the first progressive jackpot and the second progressive jackpot is a personal progressive jackpot customized for the player the personal progressive jackpot being customized in response to a second selection, by the player, from a group of types of progressive games, of a particular game type, the group of types consisting of video slots games, slot games, video poker games, video black jack games, video pachinko games, video card games, video keno games and video games of chance;

3) in response to receiving the first selection and the second selection, download software to generate the selection of the first game of chance or the second game of chance from a first remote device, download configuration information from the first remote device and configure the software and the gaming machine using the configuration information to allow play of the game of chance that is selected;

4) receive a wager on the game of chance; and 5) send to a second remote gaming device information to allow a portion of the wager to be contributed to one of the first progressive jackpot or the second progressive jackpot that is selected and 6) determine an outcome for the game of chance;

a display for displaying the outcome to the game of chance that is selected;

an input device for inputting cash or indicia of credit for the wager;

an output device for outputting cash or indicia of credit for the wager; and a network interface for communicating with the first remote device or the second remote gaming device.

12. The gaming machine of claim 11, wherein the gaming machine is coupled to one or more of a wide area progressive network, a casino area network or combinations thereof via the network interface.

13. The gaming machine of claim 11, wherein the first progressive jackpot or the second progressive jackpot is a wide area progressive jackpot.

14. The gaming machine of claim 11, wherein the a user interface is customized on the gaming machine according to preference account information of the player.

15. The gaming machine of claim 11, wherein the master gaming controller is operable to display a first amount for the first progressive jackpot and a second amount for the second progressive jackpot.

16. The gaming machine of claim 11, wherein the master gaming controller is operable to display a first progressive jackpot or a second amount for the second progressive jackpot.

17. The gaming machine of claim 11, wherein the input indicating the selection is received from a remote server.

18. The gaming machine of claim 11, wherein the input indicating the selection is received via a player tracking device coupled to the gaming machine.

19. The gaming machine of claim 11, wherein, prior to receiving the selection, the master gaming controller is further operable to display information regarding the first game of chance including the first progressive jackpot and the second game of chance including the second progressive jackpot.

\* \* \* \* \*